US012039261B2

(12) United States Patent
Glase et al.

(10) Patent No.: US 12,039,261 B2
(45) Date of Patent: Jul. 16, 2024

(54) SYSTEMS AND METHODS FOR IMPROVED USER-REVIEWER INTERACTION USING ENHANCED ELECTRONIC DOCUMENTS LINKED TO ONLINE DOCUMENTS

(71) Applicant: BOLD Limited, Hamilton (BM)

(72) Inventors: John Glase, San Juan, PR (US); James Freundlich, San Juan, PR (US); Kip Daynard, Huntsville (CA)

(73) Assignee: BOLD Limited, Hamilton (BM)

( * ) Notice: Subject to any disclaimer, the term of this patent is extended or adjusted under 35 U.S.C. 154(b) by 0 days.

(21) Appl. No.: 18/142,433

(22) Filed: May 2, 2023

(65) Prior Publication Data
US 2023/0359813 A1  Nov. 9, 2023

Related U.S. Application Data

(60) Provisional application No. 63/337,887, filed on May 3, 2022.

(51) Int. Cl.
*G06F 3/048* (2013.01)
*G06F 16/958* (2019.01)
(Continued)

(52) U.S. Cl.
CPC .......... *G06F 40/186* (2020.01); *G06F 16/986* (2019.01); *G06F 40/134* (2020.01); *G06F 40/197* (2020.01); *G06F 40/205* (2020.01)

(58) Field of Classification Search
CPC .... G06F 40/186; G06F 16/986; G06F 40/134; G06F 40/197; G06F 40/205; G06F 21/16;
(Continued)

(56) References Cited

U.S. PATENT DOCUMENTS 9,430,453 B1 *  8/2016  Ho ........................ G06F 40/226
11,055,484 B1 *  7/2021  Jansz ...................... G06F 16/93
(Continued)

FOREIGN PATENT DOCUMENTS

EP   3929799 A1   12/2021

OTHER PUBLICATIONS

International Search Report and Written Opinion for application PCT/US2023/020530 mail date Jul. 19, 2023 (9 pages).

*Primary Examiner* — Rashawn N Tillery
(74) *Attorney, Agent, or Firm* — Dinsmore & Shohl LLP

(57) ABSTRACT

Certain aspects of the present disclosure provide techniques for creating an online document. A method includes prompting, a user for a base document; determining that the base document is an existing document comprising structured data; prompting the user to select a template; encoding one or more sections of the template selected by the user with content extracted from the structured data to generate an initial online document; identifying interactive elements from the structured data; creating a section within the initial online document corresponding to the interactive elements; generating for display, the initial online document in an online document editing environment, the online document editing environment configured to enable the user to selectively edit one or more sections of the initial online document; and publishing, the initial online document as the online document, with the online document creation system, in response to an indication from the user to publish.

20 Claims, 14 Drawing Sheets

(51) Int. Cl.
*G06F 40/134* (2020.01)
*G06F 40/186* (2020.01)
*G06F 40/197* (2020.01)
*G06F 40/205* (2020.01)

(58) Field of Classification Search
CPC .. G06F 21/6218; G06F 40/131; G06F 40/143; G06F 40/151; G06F 40/174; G06F 40/106; G06Q 10/105; G06Q 10/1053; H04N 1/00005; H04N 1/00127; H04N 1/0044; H04N 1/387
See application file for complete search history.

(56) References Cited

U.S. PATENT DOCUMENTS

| | | | |
|---|---|---|---|
| 2006/0242569 A1* | 10/2006 | Grigoriadis | G06F 40/186 |
| | | | 715/205 |
| 2008/0092051 A1* | 4/2008 | Sidon | G06F 16/51 |
| | | | 715/201 |
| 2014/0129597 A1* | 5/2014 | Dong | G06F 40/174 |
| | | | 707/803 |
| 2014/0281910 A1* | 9/2014 | Ghessassi | G06F 16/285 |
| | | | 715/234 |
| 2016/0371238 A1* | 12/2016 | Heavenrich | G06F 40/186 |
| 2017/0052943 A1* | 2/2017 | Owens | G06F 40/143 |
| 2017/0220544 A1* | 8/2017 | Masson | G06F 16/951 |
| 2021/0350064 A1* | 11/2021 | Freundlich | G06F 16/3323 |
| 2021/0365481 A1* | 11/2021 | Chen | G06F 40/117 |
| 2022/0277136 A1* | 9/2022 | Shekhar | G06F 40/186 |
| 2023/0040241 A1* | 2/2023 | Liu | G06F 40/186 |
| 2023/0273952 A1* | 8/2023 | Miyauchi | G06V 30/418 |
| | | | 382/190 |

\* cited by examiner

FIG. 2

Block 140 (Document Review Portal):
- COMMUNICATION INTERFACES 241
  - WIFI COMMUNICATION INTERFACE
  - LAN COMMUNICATION INTERFACE
- PROCESSOR(S) 242
- STORAGE DEVICE 244
- MEMORY 243
  - DOCUMENT REVIEW PORTAL LOGIC 245

Block 170 (Document Interaction Portal):
- COMMUNICATION INTERFACES 271
  - WIFI COMMUNICATION INTERFACE
  - LAN COMMUNICATION INTERFACE
- PROCESSOR(S) 272
- STORAGE DEVICE 274
- MEMORY 273
  - DOCUMENT INTERACTION PORTAL LOGIC 275

Block 130:
- COMMUNICATION INTERFACES 231
  - WIFI COMMUNICATION INTERFACE
  - LAN COMMUNICATION INTERFACE
- PROCESSOR(S) 232
- STORAGE DEVICE 234
- MEMORY 233
  - METADATA EXTRACTION LOGIC 235
  - DECODING LOGIC 238

Block 110 (Document Creation Platform):
- COMMUNICATION INTERFACES 211
  - WIFI COMMUNICATION INTERFACE
  - LAN COMMUNICATION INTERFACE
- PROCESSOR(S) 212
- STORAGE DEVICE 114
  - SKIN LIBRARY 114A
- MEMORY 213
  - DOCUMENT CREATION PLATFORM LOGIC 220
  - ENCODING LOGIC 221
  - DESENSITIZATION LOGIC 222
  - RENDERING LOGIC 223
  - ELEMENT SERVICE LOGIC 224
  - EMBEDDING LOGIC 225

Databases:
- ELEMENT DEF. DB 215
- DOCUMENT DB 216
- USER-REVIEWER DATA 217
- USER DB 218
- ONLINE DOCUMENT DB 219

Block 160 (Document Submission Platform):
- COMMUNICATION INTERFACES 261
  - WIFI COMMUNICATION INTERFACE
  - LAN COMMUNICATION INTERFACE
- PROCESSOR(S) 262
- STORAGE DEVICE 264
- MEMORY 263
  - DOCUMENT SUBMISSION PLATFORM LOGIC 265

*FIG. 2*

ONLINE RESUME ANALYTICS & INSIGHTS

1100

◎ SOMEONE FROM WARSAW, POLAND VISTED YOUR RESUME ON 12-11-2019

HOW THE VISITORS FOUND YOU PROFILE:

1102

HOW MANY PEOPLE VISITED YOUR ONLINE RESUME

44

TOTAL VISITS

HOW THE VISITORS ENGAGED WITH YOUR RESUME:
- 35% GOOGLE
- 30% RESUME 1
- 25% RESUME 2
- 10% FACEBOOK

NUMBER OF VISITS ON YOUR PROFILE IN:

[LAST 30 DAYS ▼]

20 FEBUARY 2021
2

1104

| | |
|---|---|
| 40 | |
| 30 | |
| 20 | |
| 10 | |
| 0 | |

1 FEB   5 FEB   10 FEB   15 FEB   20 FEB   25 FEB   30 FEB

WHERE YOUR VISITORS COME FROM:

1106

| TOP COUNTRIES | | TOP CITIES | |
|---|---|---|---|
| UNITED STATES | 2 | ADDISON, UNITED STATES | 2 |
| INDIA | 2 | BELEN, UNITED STATES | 2 |
| POLAND | 2 | PASADENA, UNITED STATES | 2 |
| UNITED KINGDOM | 2 | SALINAS, UNITED STATES | 2 |
| CANADA | 2 | ROUND ROCK, UNITED STATES | 2 |

SUMMARY

1108

| RESUME ID | DOWNLOADED RESUME | LINKS ON RESUME | CLICKS |
|---|---|---|---|
| 1 | JOHN DOE RESUME<br>(STARBUCKS) (WWW.INDEED.COM/STARBUCKS)<br>(+ADD LABEL) | HOURS AVAILABLE TO WORK, COMPLETE LIST OF SKILLS | 5 |
| 2 | JOHN DOE RESUME<br>(MCDONALD) +ADD JOB URL<br>(+ADD LABEL) | MY DIGITAL RESUME | 2 |

*FIG. 11*

SYSTEMS AND METHODS FOR IMPROVED USER-REVIEWER INTERACTION USING ENHANCED ELECTRONIC DOCUMENTS LINKED TO ONLINE DOCUMENTS

CROSS-REFERENCE TO RELATED APPLICATIONS

This application claims priority to U.S. Provisional Application No. 63/337,887 filed May 3, 2022, the entirety of which is hereby incorporated by reference.

INTRODUCTION

Technical Field

The present specification relates to systems and methods for creating an online document.

BACKGROUND

Electronic documents are frequently submitted by users through a document submission system (e.g., a website or other online system) for review and processing. By way of example, a job seeker will typically prepare a precisely formatted resume, cover letter, or the like (e.g., as a Microsoft Word DOCX or Adobe Acrobat PDF file) that they may upload and submit as part of an online job application (e.g., through an employer's website, a job application board, a social media platform, or the like). The application, including the documents uploaded by the job seeker, will frequently be forwarded to and processed through an applicant tracking system (ATS), or other document review system, which may allow a recruiter or human resources (HR) personnel at a hiring entity to review the application and take appropriate action (e.g., contacting the job applicant to schedule an interview, requesting additional information, etc.). The ATS may process the uploaded documents in order to facilitate review by the recruiter or human resource (HR) personnel, for example, by generating a document "preview" that the recruiter may view and interact with through a portal provided by the ATS system. The ATS may also process the uploaded documents to automatically extract information therefrom to be used by the ATS system, and may rely on a document parsing system or integrated parsing software to do so.

Traditional document submission and review systems collect and disseminate information contained in the electronic document which is heavily summarized and does not contain any further explanation. For example, a resume entry for work history typically includes a few short bullet points summarizing the employee's responsibilities leaving many important details out. Further, the electronic document cannot be altered after it has been transmitted without an entire new copy being sent.

Furthermore, the user submitting the document is unable to follow up regarding the particular document submission. Job applicants, for instance, frequently wish to supplement the information provided in their resumes, provide updated or additional relevant information, or simply, show continued interest in a position. Applicants will often make "cold calls" or send unsolicited e-mails in an attempt to obtain an update as to the status of their application. But the user is unlikely to reach the right HR personnel, or even receive a response, and invariably find themselves in the "black hole" once again. This "black hole" problem does little to endear the applicant to the potential employer and may leave the applicant feeling as though the employer is disinterested, even if this is not the case. The applicant may be turned off by the lack of responsiveness or otherwise conclude to move on in their job search.

At the same time, the operator of the document submission system frequently finds itself requiring additional information about the applicant, such as work availability, interests, additional details about work history, etc., that may not be contained in the received electronic document.

BRIEF SUMMARY

In embodiments, a computer-implemented for creating an online document is disclosed. The method includes prompting, a user for a base document; determining that the base document is an existing document comprising structured data; prompting the user to select a template from a plurality of templates; encoding one or more sections of the template selected by the user with content extracted from the structured data to generate an initial online document; identifying one or more interactive elements from the structured data; creating a section within the initial online document corresponding to at least one of the one or more interactive elements; generating for display, the initial online document in an online document editing environment, the online document editing environment configured to enable the user to selectively edit one or more sections of the initial online document; and publishing, the initial online document as the online document, with the online document creation system, in response to an indication from the user to publish.

In some embodiments, a system for creating an online document is disclosed. The system includes a computing device comprising one or more processors and one or more non-transitory computer-readable mediums storing computer readable instructions that, when executed by the one or more processors, cause the computing device to: prompt a user for a base document; determine that the base document is an existing document comprising structured data; prompt the user to select a template from a plurality of templates; encode one or more sections of the template selected by the user with content extracted from the structured data to generate an initial online document; identify one or more interactive elements from the structured data; create a section within the initial online document corresponding to at least one of the one or more interactive elements; generate for display the initial online document in an online document editing environment, the online document editing environment configured to enable the user to selectively edit one or more sections of the initial online document; and publish the initial online document as the online document, in response to an indication from the user to publish.

These and additional features provided by the embodiments described herein will be more fully understood in view of the following detailed description, in conjunction with the drawings.

DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

FIG. 2 illustrates a more detailed view of the enhanced document creation system, document submission system, document parsing system, and user-reviewer interface system, as well as their constituent components, according to one or more embodiments shown and described herein.

FIG. 11 depicts an analytics report screen related to an online document, according to one or more embodiments shown and described herein.

DETAILED DESCRIPTION

Figure 1:
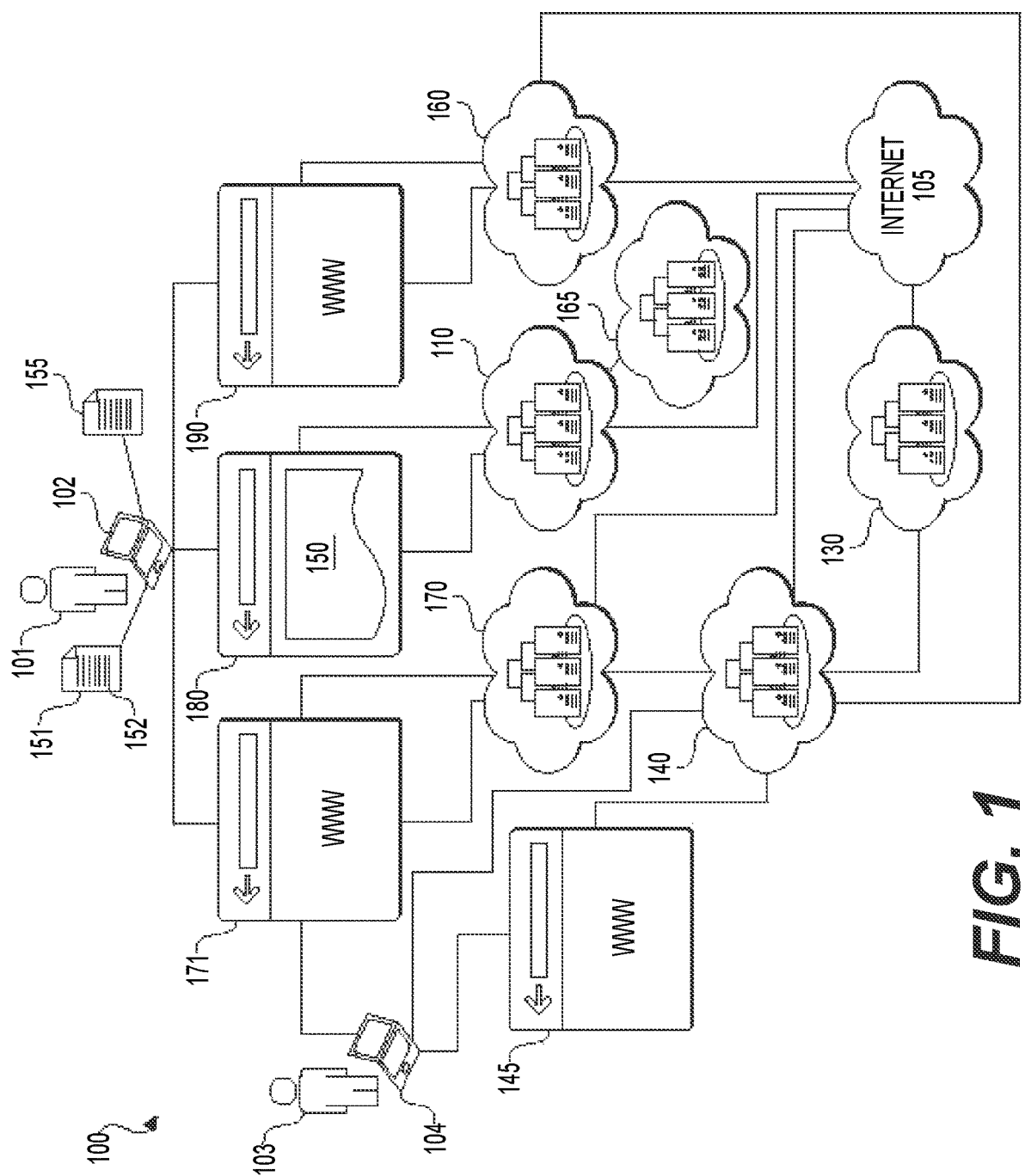
FIG. 1 illustrates an exemplary environment in which the systems and methods of the present disclosure may be used, according to one or more embodiments shown and described herein.

Embodiments disclosed herein seek to address limitations in traditional document submission and review systems through the use of an online document that can be created from a base electronic document. Traditional document submission and review systems collect and disseminate information contained in the electronic document which is heavily summarized and does not contain any further explanation. For example, a resume entry for work history typically includes a few short bullet points summarizing the employee's responsibilities leaving many important details out. Further, the electronic document cannot be altered after it has been transmitted without an entire new copy being sent.

Furthermore, with traditional document submission and review systems, the user submitting the document is unable to follow up regarding the particular document submission. Job applicants, for instance, frequently wish to supplement the information provided in their resumes, provide updated or additional relevant information, or simply, show continued interest in a position.

Traditional document submission and review systems have a technical problem of interconnecting an electronic document with external sources of information such as a user's online resume or profile and additional content such as interactive elements described herein that may not be amenable to incorporation in their entirety in the electronic document submitted to the traditional document submission and review system. Embodiments of the present disclosure provide technical solutions to at least the aforementioned technical problems by providing systems and methods for creating, synchronizing, and linking online documents, such as a user's online profile or resume with a corresponding electronic document. Accordingly, traditional document submission and review systems and other related systems are provided with improved functionality and interaction with relevant content and supplemental content that could not otherwise be provided through a submission to the system.

Embodiments of the present disclosure provide systems and methods for creating and managing online documents that can be linked and synchronized with enhanced documents, which may be submitted to through traditional document submission and review systems, but maintain a link to the user and the user's online document. The interconnection that is established by embodiments of the present disclosure enable the ability for a user and reviewer to have more transparency with respect to a job application process, for example. For example, and which will become more readily understood by the following disclosure, a user may continue to make updates to and provide supplemental information to their online document even though they may have already submitted an enhanced document for consideration. Since the enhanced document includes a link to the online document, a reviewer can readily access a user's online document as they consider the user, for example, for a job.

Additionally, the online document creation system described herein enables a user to quickly and accurately create an online document from a base document which they may have already invented considerable time into perfecting. The online document creation system leverages the content of the base document, whether the base document contains unstructured data or structured data to encode a template for an online document that the user can then directly edit without the need to understand computer coding language or have online web and document design skills. Accordingly, the online document creation system removes many barriers for a user to develop and publish an online document to achieve a goal such as finding a new job without needing to expend considerable time that could be spent seeking and applying for jobs.

Furthermore, embodiments of the present disclosure utilize structured data within the enhanced documents and online documents created by the systems and methods described herein. By leveraging structured data, traditional document submission and review systems can be improved to include a recognition process that identifies when structured data is being provided by a user either through their enhanced document or online document to improve the efficiency and accuracy of the review process for a job posting that can receive hundreds or thousands of applicants. The structured data is more readily searched, categorized and filtered. Additionally, supplemental information, for example, made available through the online document linked to a user's enhanced document submitted to a job posting may also be queried, searched, categorized and filtered so that a reviewer has access to a more complete understanding of the applicant and up to date information. Additional advantages and improvements to at least the field of electronic and online documents will be understood by the present disclosure.

The online document may be an HTML version of a base document hosted at a service provider. The online document can be linked to the enhanced document so that changes to any section of online document are synchronized to that of enhanced document (and vice versa).

The electronic document includes a link to the online document. Additionally, changes in common information shared between the electronic document and the online document can be synchronized. A plurality of different links can be provided that point to the same online document. By choosing a different link to be included in the electronic document when submitting the electronic document to the document submission and review system, the submitting user can track analytics related to the selection and engagement with the online document.

Example Environment for Creating and Deploying Enhanced Documents and Online Documents FIG. 1 illustrates an exemplary environment 100 in which the systems and methods of the present disclosure may be deployed, according to one or more embodiments. As illustrated, the environment may include an enhanced document creation system 110, a document submission system 160, a document parsing system 130, a document review system 140, a user-reviewer interface system 170, and one or more users 101 and reviewers 103, which may be able to communicate and interact with one another over the Internet 105. Each user 101 may have a user device 102 (e.g., a personal computer, a cellular telephone, a PDA, or the like), which the users 101 may use to interact with enhanced document creation system 110, document submission system 160, and user-reviewer interface system 170. Similarly, each reviewer 103 may have a reviewer device 104 (e.g., a personal computer, a cellular telephone, a PDA, or the like), which the reviewers 103 may use to interact with document review system 140 and user-reviewer interface system 170. The user device 102 and the reviewer device 104 may include a display device for implementing a user interface with the respective user or reviewer, one or more processors for executing logic and one or more non-transitory computer-readable mediums for storing information and/or computer readable instructions.

For example, in one exemplary mode of operation, user 101 may create an enhanced document 151 (e.g., a resume having interactive elements 152), using a document creation platform 180 hosted by the enhanced document creation system 110 (e.g., a resume creation platform). In creating the enhanced document 151, user 101 may be able to add or include one or more interactive elements 152, which may allow a reviewer 103 to take action with respect to the enhanced document 151. In doing so, user 101 may be directed to a document interaction platform 171 hosted by the user-reviewer interface system 170, which, in turn, may trigger the execution of logic associated with the interactive element 152 that was selected. The user-reviewer interface system 170, for example, may prompt the user 101 to enter information needed to execute the associated logic (e.g., information needed to support the functionality to be provided by the interactive element 152), and/or call or otherwise trigger a function or service (e.g., by calling a public facing service of the enhanced document creation system 110, document submission system 160, document review system 140, document parsing system 130, and/or a third-party system). The user-reviewer interface system 170, for instance, may present the user 101 with a series of one or more prompts soliciting information needed to support the functionality of the interactive element 152, or may automatically retrieve the necessary information (e.g., from enhanced document creation system 110 or an external website). Once finalized, the user 101 may export the enhanced document 151 in a particular file format, which the user 101 may then upload and submit to document submission system 160 (e.g., a job application board, recruiting portal, or the like).

Document submission system 160 may pass the enhanced document 151 along to the document review system 140, which may automatically process the enhanced document 151 and present it to reviewer 103 through a document review portal 145, through which the reviewer 103 may review the enhanced document 151 (e.g., allowing the reviewer 103 to download the enhanced document 151 and/or presenting a "preview" of the enhanced document 151 through the document review portal 145). In doing so, the document review system 140 may reach out to document parsing system 130 to help parse the enhanced document 151, which may return the contents of the enhanced document 151 in a structured form (or multiple forms) usable by the document review system 140. The reviewer 103 may then be able to take action with respect to the enhanced document 151 using the interactive elements 152 provided therein.

In doing so, the reviewer 103 may be directed to the document interaction platform 171 of the user-reviewer interface system 170, which, in turn, may trigger the execution of logic associated with the interactive element 152 that was selected. The user-reviewer interface system 170, for example, may re-direct the reviewer 103 to an external website, prompt the reviewer 103 to enter additional information needed in order to execute the associated logic, and/or call or otherwise trigger a function or service (e.g., by calling a public facing service of the enhanced document creation system 110, document submission system 160, document review system 140, document parsing system 130, and/or a third-party system). The user-reviewer interface system 170 may also provide the user 101 with a notification with details regarding the reviewer's action (e.g., via an SMS message, e-mail message, mobile application, or user dashboard provided through document interaction platform 171). The notification may also indicate whether further action by the user 101 is necessary, or whether optional actions can be taken, and may direct the user 101 to the document interaction platform 171 to do so (e.g., through an interactive element 152 or hyperlink provided therein). If the user 101 does take action, a similar notification may be sent to the reviewer 103, and the user 101 and reviewer 103 may be able to actively engage with one another as desired. In this way, user-reviewer interface system 170 is able to facilitate better communication and interaction between the user 101 and reviewer 103. In some cases, the document review system 140 may have an arrangement or relationship with the enhanced document creation system 110 and/or user-reviewer interface system 170, which may allow for the above-mentioned communications and interactions to be integrated within the document review system 140 and/or document review portal 145 itself.

Each interactive element 152 may be provided with some form of permissioning or access before the interactive element 152 is allowed to be accessed. For example, the reviewer 103 may first be instructed to provide a password after selecting an interactive element 152. The logic associated with the interactive element 152, such as providing availability or personal information, would only then be executed if the correct password is provided.

After the creation of enhanced document 151, user 101 may choose to create an online document using online document creation system 165 to create online document 155 corresponding to enhanced document 151. The enhanced document 151 can be linked to the online document 155 by including an interactive element 152 within enhanced document 151 that links them together. When a reviewer interacts with the interactive element 152, they would be redirected to online document 155. For example, if enhanced document 151 is in the form of a resume, online document 155 may take the form of an online resume comprising information that supplements that contained within online document 155. Online document 155 may comprise longer descriptions related to work history and/or additional sections not contained within enhanced document 151. Online documents 155 can be stored in online document database 219 (e.g., as depicted in FIG. 2).

The foregoing description provides a high-level overview of one non-limiting mode of system operation. The description that follows provides additional details regarding the systems, features and functionality described, and covers additional and/or alternative embodiments. While the description that follows may refer to a job applicant and employer context to illustratively describe the various systems and their operation, it should be appreciated that the disclosure is not thus limited and can be naturally extended to any number of additional contexts.

As noted above, the enhanced document creation system 110 may host a document creation platform 180 that users 101 may interface with over the Internet 105 (e.g., using a web browser presented through a user interface of a on user device 102) to create and format an initial document 150, view and update the document, and export the document as enhanced document 151 having one or more interactive elements 152 provided therein. The interactive elements 152 may take the form of a button, image, machine-readable code (e.g. barcode, QR code, etc.), and/or formatted text and may have a hyperlink associated therewith, which may allow a reviewer 103 of the enhanced document 151 to take action with respect to the document and/or its submission (e.g., through document submission system 160). For example, an interactive element 152 may be provided in the enhanced document 151 providing a hyperlink to an online document 155 or a section of online document 155.

The interactive elements 152, for example, may allow the reviewer 103 to quickly assess whether the user 101 or submission meets certain minimum requirements, view additional information not included within the enhanced document 151, contact the user 101 who submitted the enhanced document 151, or otherwise interact with the user 101. The interactive elements 152, for instance, may provide an update to the user 101 regarding the status of the document submission (e.g., whether there was an error with the submission, whether the document was under review, whether the submission was approved or denied), request additional information or documents from the user 101, or initiate communication with the user 101 (e.g., by sending an email or text message to the user 101, initiating a telephone or VoIP call to the user 101, or sending the user 101 a notification through a user dashboard hosted by the user-reviewer interface system 170). In some cases, the interactive elements 152 might call upon third-party systems or services to interact with the user 101, for example, allowing a reviewer 103 to view the user's calendar and/or schedule an appointment with the user 101 (e.g., through public facing Google Calendar, Microsoft Outlook, or Apple iCal APIs).

The document creation platform 180 may allow users 101 to create an initial document 150 in a number of different ways, for example, by presenting the user 101 with a fillable form, a document template, a wizard that prompts the user 101 for specific information, a WYSWIG editor, or the like. The document creation platform 180 may also allow a user 101 to select a skin or style template to apply to the document, which may help to ensure that the initial document 150 (and enhanced document 151, when exported) has a uniform appearance. As used herein, the term "skin" refers to a custom graphical appearance preset package that is applied to the initial document 150 after creation. Initial enhanced documents 151 created with the same skin or style template will have a similar look and appearance, though the content of the initial enhanced document 151 will differ. When creating the initial document 150, the user 101 may be able to add or include one or more interactive elements 152. The interactive elements 152, for example, may be included as part of the document template, included in response to specific prompts in the document creation wizard (e.g., asking the user 101 whether they wish to add one or more interactive elements 152 and/or a section for interactive elements 152), or selected from a list of interactive elements 152 presented to the user 101 through the document creation platform 180 (e.g., as a widget provided in the WYSWIG editor).

When adding the interactive elements 152, the user 101 may be directed to a document interaction platform 171 hosted by the user-reviewer interface system 170, which, in turn, may trigger the execution of logic associated with the interactive element 152 that was selected. The user-reviewer interface system 170, for example, may prompt the user 101 to enter additional information needed in order to execute the associated logic, and/or call or otherwise trigger a function or service (e.g., by calling a public facing service of the enhanced document creation system 110, document submission system 160, document review system 140, document parsing system 130, and/or a third-party system). For instance, where the interactive element 152 is intended to allow a reviewer 103 to schedule a meeting or appointment with the user 101, the user 101 may need to provide information regarding their availability (e.g., specific dates and times, a link to their calendar, etc.). The user 101, through the document interaction platform 171, may be funneled through a series of prompts soliciting the required information. The information provided by user 101 may be returned to the enhanced document creation system 110 and stored (e.g., in user-reviewer data database 217 in association with a unique document and/or element identifier) for later retrieval (e.g., when the reviewer 103 selects the interactive element 152).

Once added, the user 101 may be able to customize the appearance of the interactive elements 152, for example, by adjusting their attributes (e.g., background color, visible text or image, etc.) and/or position within the document, allowing the user 101 to feature the interactive elements as prominently or subtly as desired. In some cases, the appearance of the interactive elements 152 may be governed in part, or in whole, by an associated skin or style template (e.g., of the element itself or the document as a whole), which the user 101 may be able to select and/or change through the document creation platform 180. In other cases, the document creation platform 180 may limit the user's ability to customize the appearance of the interactive elements 152, for example, only allowing the user to adjust the position of the interactive elements 152 between specific areas or regions of the document. As another example, the appearance of the interactive element 152 may be governed by an overall skin or style template of the initial document 150 itself. As noted above, this may allow the document creation platform 180 to ensure that the initial document 150 (and enhanced document 151, when exported), including interactive elements 152, have a uniform appearance. In some embodiments, the user 101 may be able to select or choose interactive elements 152 to be made available to the reviewer 103 (e.g., through the document interaction platform 171 or document review portal 145) but not included as a visible element in the document itself. In other embodiments, the user 101 may be able to designate certain interactive elements 152 to be excluded when printing the document.

As an illustrative example, the enhanced document creation system 110 may host a resume creation platform that users 101 may use to create, view, update, and export resumes having interactive elements 152. The resume creation platform, for example, may allow the user 101 to add or provide one or more of the following interactive elements 152 that a reviewer 103 of the resume may select or click to take action.

For example, a resume may include a "My Personal Website" interactive element, which may re-direct the reviewer 103 to a personal career website of the user 101. When adding the interactive element, the user 101 may have been prompted for a link to their personal website through the document interaction platform 171.

In addition, a resume may include a "Video About Me" or "Video Resume" interactive element, which may re-direct the reviewer 103 to a video resume prepared by the user 101 (e.g., hosted on YouTube®, Vimeo®, or other video hosting service, the user's personal website, or the document interaction platform 171 of the user-reviewer interface system 170). When adding the interactive element, the user 101 may have been prompted for a link to the external website hosting the video, prompted to upload their video resume to the user-reviewer interface system 170, and/or prompted to create their video resume through the document interaction platform 171.

In addition, a resume may include a "Public Testimonials" or "Google Me" interactive element, which may re-direct the reviewer 103 to preferred and/or filtered search results regarding the user 101 (e.g., via Google®, LinkedIn®, or other search engine or service). When adding the interactive element, the user 101 may have been prompted for a link to the search results or may have been guided through a process of creating preferred and/or filtered search results to be linked to through the document interaction platform 171.

In addition, a resume may include a "LinkedIn Profile" or "Facebook Profile" interactive element, which may re-direct the reviewer 103 to the user's social media profile (e.g., on LinkedIn or Facebook). When adding the interactive element, the user 101 may have been prompted for a link to their profile and/or may guide the user 101 through the process of establishing and authorizing a relationship between the social media platform and, for example, the user-reviewer interface system 170.

In addition, a resume may include an "Online resume" interactive element, which may direct the reviewer 103 to online document 155 hosted online at a specific website (e.g., a permalink), which may be provided by the enhanced document creation system 110 and/or presented to the reviewer 103 through the document interaction platform 171. The online document 155 can be synchronized with the enhanced document 151 such that when changes are made to the enhanced document 151, the updates are pushed to the online document 155 automatically or upon approval by user 101. The online document 155 may be initially created from the enhanced document 151 by online document creation system 165.

In addition, a resume may include a "Work Portfolio" interactive element, which may allow the reviewer 103 to view a portfolio of the user's work (e.g., an artistic portfolio, articles that the user has written or has had published, or the like) and may re-direct the reviewer 103 to an external website or the document interaction platform 171 itself where the user 101 may have their work hosted. The work portfolio interactive element may link the user to a related section of the online document 155. When adding the interactive element, the user 101 may be prompted to provide a link to the external website or upload their work to the user-reviewer interface system 170 itself.

In addition, a resume may include a "Complete List of Skills" interactive element, which may present the reviewer 103 with a complete list of skills believed to be relevant to the role toward which the resume is directed (e.g., via the document interaction platform 171), which the user 101 may not have been able to include in the resume itself (e.g., due to space limitations). The complete list of skills interactive element may link the user to a related section of the online document 155. When adding the interactive element, the user 101 may be prompted to enter the complete list of skills through the document interaction platform 171.

In addition, a resume may include a "Current Licenses/Certificate" interactive element, which may present the reviewer 103 with a list of the certifications (e.g., nursing certifications), licenses (e.g., license to practice law), and/or accreditations obtained by the user 101 (e.g., as images displayed via the document interaction platform 171). In some cases, the interactive element will trigger a notification to the user 101 indicating that the reviewer 103 has requested to see their licenses, certifications, and accreditations, and optionally may request their approval or authorization before disclosing them to the reviewer 103. The current licenses/certificate interactive element may link the user to a related section of the online document 155. The reviewer 103 may also be presented with proof that the licenses, certifications, and accreditations are current, up to date, and active (e.g., by redirecting the reviewer 103 to an external website of the entity that manages the certification, license, or accreditation).

In addition, a resume may include a "Student Transcripts" interactive element, which may present the reviewer 103 with the most recent transcripts of the user 101. The student transcripts interactive element may link the user to a related section of the online document 155. When adding the interactive element, the user 101 may be prompted to upload copies of their transcripts or link to or otherwise establish a relationship with the associated educational institution, which may directly provide the reviewer 103 with official transcripts.

In addition, a resume may include a "List of Hobbies" interactive element, which may present the reviewer 103 with a list of hobbies of the user 101 (e.g., via the document interaction platform 171), which the user 101 may not have thought necessary to include in the resume itself. The list of hobbies interactive element may link the user to a related section of the online document 155. When adding the interactive element, the user 101 may be prompted to enter a list of their hobbies or select one or more hobbies from a list through the document interaction platform 171.

In addition, a resume may include a "Willing to Travel" interactive element, which may indicate to the reviewer 103 a user's availability and desire to travel. The willing to travel interactive element may link the user to a related section of the online document 155. When adding the interactive element, the user 101 may be prompted to provide this information through the document interaction platform 171.

In addition, a resume may include a "Car Access" interactive element, which may let the reviewer 103 know whether the user 101 has access to a car, a valid driver's license, and/or car insurance. The car access interactive element may link the user to a related section of the online document 155. When adding the interactive element, the user 101 may be prompted to provide this information, for example, through the document interaction platform 171 (e.g., by entering their license information and uploading proof of insurance) and/or by linking to an external website (e.g., a website of the user's insurance provider, or a license verification service at the DMV).

In addition, a resume may include a "Work Eligibility" interactive element, which may indicate to the reviewer 103 whether the user 101 is authorized to work in a particular country. The work eligibility interactive element may link the user to a related section of the online document 155. When adding the interactive element, the user 101 may be prompted to identify the country or countries in which they are authorized to work through the document interaction platform 171. In other cases, the user-reviewer interface system 170 may automatically retrieve this information from a user profile maintained at the enhanced document creation system 110.

In addition, a resume may include a "Request References" interactive element, which may provide the reviewer 103 with a list of references provided by the user 101, and allow the reviewer 103 to contact them, for example, directly through the document interaction platform 171. In some cases, the interactive element may trigger a notification to the user 101 indicating that the reviewer 103 has requested to see their references, and optionally may request their approval or authorization before disclosing the references to the reviewer 103. When adding the interactive element, the user 101 may be prompted to identify their references and indicate whether an authorization request would be desired through the document interaction platform 171

In addition, a resume may include a "Verified Resume" or "Verified Details" interactive element, which may indicate to the reviewer 103 whether the information in the enhanced resume has been verified and is accurate (e.g., by the enhanced document creation system 110). For example, the reviewer 103 may be provided with an indication that the academic credentials (e.g., transcripts, degrees or diplomas, test scores, etc.), technical certifications, work experience, or skills listed by the user in the resume have been verified, and in some cases, may be provided with proof of such verification.

In addition, a resume may include a "Background Check" interactive element, which may allow the reviewer 103 to request and/or view the results of a background check run on the user 101. When adding the interactive element, the user 101 may be prompted to provide authorization (e.g., as required by applicable laws) to run the background check and/or release the results to the reviewer 103 through the document interaction platform 171.

In addition, a resume may include an "Estimated Commute" interactive element, which would provide the reviewer 103 with the estimated commute time that the user 101 would face, while also protecting the user's privacy since the user 101 need not disclose where they live and/or would be commuting from. When adding the interactive element, the user 101 may be prompted to enter the address from which they would be commuting through the document interaction platform 171. While in other cases, the user-reviewer interface system 170 may pull this information automatically from the enhanced document creation system 110 (e.g., from a user profile maintained there).

In addition, a resume may include a "Salary Requirements" interactive element, which may provide the reviewer 103 with any salary requirements specified by the user 101 and/or present the reviewer 103 with a salary negotiation tool, through which the reviewer 103 and user 101 may be able to negotiate a mutually agreeable salary and/or benefits package. The salary interactive element may link the user to a related section of the online document 155. When adding the interactive element, the user 101 may be prompted to indicate their desired and/or minimum salary through the document interaction platform 171.

In addition, a resume may include an "Hours Available" interactive element, which may provide the reviewer 103 with a calendar indicating what days and time periods or shifts the user 101 can fill. The "Hours Available" interactive element may link the user to a related section of the online document 155. When adding the interactive element, the user 101 may be prompted to fill out a schedule (e.g., allowing the user 101 to specify their availability for a morning, daytime, evening, and nighttime shift for each day of the week) or guided through a process for importing or linking to an existing calendar (e.g., through public facing Google Calendar, Microsoft Outlook, or Apple iCal APIs) through the document interaction platform 171.

In addition, a resume may include a "Send Message" or "Contact Me" interactive element, which may allow the reviewer 103 to send the user 101 a text message, e-mail, or other notification, or allow the reviewer 103 to otherwise contact the user 101 (e.g., by initiating a VoIP phone call), directly through the document interaction platform 171, which may help to maintain the privacy of the user 101. When adding the interactive element, the user 101 may be prompted for their contact information and preferred manner of contact through the document interaction platform 171. In some cases, the interactive element may refer to a specific mode of communication (e.g., through a "Text Me" or "WhatsApp Me" interactive element), while in other cases the interactive element may refer to the method of contact the user is likely to respond to the fastest (e.g., through a "Contact Me Quickly" interactive element).

In addition, a resume may include a "Received"\"Under Review" interactive element, which may allow the reviewer 103 to quickly send a notification to the user 101 letting them know their resume was received and/or is under review, and optionally letting them know when they may receive a follow-up communication.

In addition, a resume may include an "Interested"\"Not Interested" interactive element, which may allow the reviewer 103 to easily send a notification to the user 101 indicating a decision the reviewer 103 reached regarding the user's resume.

In addition, a resume may include a "Schedule Interview" interactive element, which may allow the reviewer 103 to view the availability of the user 101 for conducting an interview (e.g., presenting the reviewer 103 with a calendar)

and may allow the reviewer 103 to schedule the interview (e.g., by sending the user 101 a Google or Outlook calendar invitation). In some cases, the interactive element may trigger a notification to the user 101 indicating that the reviewer 103 has requested an interview, and optionally may request the user 101 confirm their availability or propose a more suitable time to the reviewer 103. When adding the interactive element, the user 101, through the document interaction platform 171, may be prompted to provide information regarding their availability, for example, soliciting specific dates and times as to their availability, asking the user to submit a link to an electronic calendar of the user 101, or guide the user 101 through the process of establishing and authorizing a relationship with a calendar service calendar (e.g., through public facing Google Calendar, Microsoft Outlook, or Apple iCal APIs).

As indicated, the interactive elements 152 may also be incorporated into online document 155 to mirror or supplement those in enhanced document 151. Because it is not generally as important for online document 155 to be as concise as enhanced document 151, online document 155 may incorporate one or more additional sections or interactive elements 152 compared to those contained in the corresponding enhanced document 151.

The foregoing examples are illustrative in nature and are not intended to limit the present disclosure, and one skilled in the art would appreciate that a number of other interactive elements, which may provide additional or alternative functionality, could be provided without deviating from the scope of the disclosure.

The document creation platform 180 may allow the user 101 to save the initial document 150 in a particular state, which the user 101 can later restore to view and/or further modify. The user 101 may also choose to download or export the initial document 150 in a particular file format. In response to the user request, the enhanced document creation system 110 may ask the user 101 to confirm that the initial document 150 and interactive elements 152 are finalized. If not, the user 101 may be able to review and update their appearance, to the extent permitted by the document creation platform 180, along with any underlying information provided by the user 101 (e.g., providing updated availability for a meeting) or select one or more additional interactive elements 152 to add or choose to make available if so desired. Once finalized, the enhanced document creation system 110 may render the initial document 150 in a particular file format (e.g., in Microsoft Word's DOCX format or Adobe Acrobat's PDF format) and export it as enhanced document 151.

Traditional file formats, like Microsoft Word's DOCX format or Adobe Acrobat's PDF format, while allowing for documents to be rendered in a manner that is visually appealing to a human reader, typically store information in an unstructured manner making it difficult for automated parsing software (or parsers) to interpret the electronic document accurately, resulting in misread, miscategorized, or discarded information and preventing or complicating further processing of the document. By way of example, a job seeker will typically prepare a precisely formatted resume (e.g., as a DOCX or PDF file) that they may upload in the process of submitting an online job application. However, an applicant tracking system (ATS) or other document review system, and/or the resume parsing system on which it may rely, may encounter difficulties when attempting to parse the resume to extract information therefrom. As a result, the resume may never make it to a human reviewer or the human reviewer may be presented with incorrect or incomplete information about the job seeker.

Accordingly, in some embodiments, the enhanced document creation system 110 may take additional steps to ensure that the enhanced document 151 can be completely and accurately parsed, for example, by employing the techniques described in co-pending U.S. patent application Ser. No. 17/207,304, entitled SYSTEMS AND METHODS FOR CREATING ENHANCED DOCUMENTS FOR PERFECT AUTOMATED PARSING, which is incorporated by reference herein in its entirety. The enhanced document creation system 110, for example, may encode the content of initial document 150 (including any interactive elements 152) in accordance with a defined schema, and embed the resulting structured data as non-visible metadata in the rendered document. The resulting enhanced document 151 can be completely and accurately parsed by a document parsing system 130 capable of extracting and decoding the metadata embedded therein. Alternatively, the enhanced document creation system 110 may store the encoded document content in association with a document identifier (e.g., in document database 216), which may instead be embedded as non-visible metadata in the document. In such cases, the document parsing system 130 may extract the embedded document identifier, request the encoded content associated therewith from the enhanced document creation system 110, and decode the structured data received from the enhanced document creation system 110 to parse the enhanced document 151. Furthermore, as discussed in U.S. patent application Ser. No. 17/207,304, the parsing functionality need not be performed by a standalone document parsing system 130, and can naturally be extended for use directly by a document submission system 160 (e.g., through a widget, embedded library, or the like). Similarly, the parsing functionality can be extended for use directly at a document review system 140 (e.g., an ATS or other resume review system).

In addition to the creation of the enhanced document 151, an online document 155 may also be created in a manner similar to that of enhanced document 151. For example, a wizard may be employed instructing the user 101 to enter information into different sections (e.g., address, employment history, skills, etc.) that makeup the online document 155.

In one embodiment, the online document 155 may be an HTML version of the enhanced document 151 hosted at a service provider. The online document 155 can be linked to the enhanced document 151 so that changes to any section of online document 155 are synchronized to that of enhanced document 151 (and vice versa). Enhanced document 151 may include the link to a corresponding online document 155 (e.g., using an interactive element such as a hyperlink or a machine-readable code encoded with the website URL). For example, each online document 155 is associated with one or more enhanced document 151, with each enhanced document containing a different unique link pointing to the same online document 155. By sending out the enhanced documents 151 comprising the different links to different reviewers 103, the user 101 can track the reviewers' interaction with the online document 155 by tracking the visits to the different unique link. For example, a first enhanced document 151 comprising a first link may be sent to a first reviewer 103 and a second enhanced document 151 comprising a second link may be sent to a second reviewer 103. The first link and the second link direct the reviewers 103 to the same online document 155, but analytics related to the engagement with online document 155 by the first reviewer 103 and the second reviewer 103 can be tracked by monitoring traffic to each link.

Online document 155 may further be edited to include additional sections from those found in corresponding enhanced document 151. Because online document 155 is hosted, the content can be updated or supplemented at any time unlike an enhanced document 151 which must be resent with updates.

In some embodiments, the online document creation system 165 may compare the online document 155 with the existing document (e.g., originating enhanced document 151, which may be linked to the online document 155 by a unique link) to determine a presence of a difference in content between the online document and the existing document. When differences in content are determined to be present, the online document creation system 165 can create an updates section in the online document comprising a listing of updates present in the online document compared to the existing document. Additionally, in some embodiments, when differences in content are determined to be present, the online document creation system 165 can create an updated existing document comprising content present in the online document and absent from the existing document. The online document creation system 165 can create a new section to the online document 155 on the fly that comprises a listing of updates made to the online document 155 that are not contained in the originating enhanced document 151. For example, if a user has added a new description to a work history or updated personal information, the update section of the online document would show those updates. The update section provides the reviewer 103 with a clear picture of what has been updated since the enhanced document 151 has been created. In some embodiments, the reviewer 103 may request an updated enhanced document 151 containing the updated information in the update section so the reviewer 103 has a more recent version.

The parsing utilized to create an enhanced document 151 from initial document 150 may also be utilized to create the initial content for online document 155. In some embodiments, online document creation system 165 presents the user with an online document creation platform similar to that of document creation platform 180 already described. The online document creation platform may utilize a wizard to guide the user 101 through the creation of the online document 155. The options provided to the user 101 in creating the online document 155 may be greater or different than those offered by document creation platform 180. This is because different content and sections may be suitable for viewing in an online document 155 (e.g., videos, photos, longer descriptions) than those contained in enhanced document 151.

After exporting and downloading the enhanced document 151, user 101 may submit the enhanced document 151 to a document submission system 160 for processing, for example, through a document submission platform 190 that users 101 may interface with over the Internet 105 (e.g., using a web browser presented through a user interface of a user device 102). By way of example, document submission system 160 may host a job application board, which may provide the user 101 with the ability to search through job postings and submit an application for a job by uploading a resume and other application materials (e.g., cover letter, references, etc.).

The document submission system 160 may forward or otherwise provide the enhanced document 151 to the reviewer 103 (e.g., via e-mail viewable through reviewer device 104) as a stand-alone document. Upon downloading and opening the enhanced document 151, the reviewer 103 may be able to click or otherwise select an interactive element 152 to take or initiate the action associated therewith. As described, the interactive element 152 may be a link or machine-readable code that directs the reviewer 103 to the online document 155. Selecting the interactive element 152 may direct the reviewer 103 to the user-reviewer interface system 170, which may automatically trigger the execution of logic associated with the interactive element 152 that was selected. The user-reviewer interface system 170, for example, may re-direct the reviewer 103 to an external website, prompt the reviewer 103 to enter additional information needed in order to execute the associated logic, and/or call or otherwise trigger a function or service (e.g., by calling a public facing service of the enhanced document creation system 110, document submission system 160, document review system 140, document parsing system 130, and/or a third-party system). Where additional information is required, the reviewer 103 may be directed to the document interaction platform 171 and funneled through a series of prompts to solicit the necessary information, after which the action may be taken. In some embodiments, the user-reviewer interface system 170 may allow the reviewer 103 to create an account, or log into an existing account, with the system.

By directing the reviewer 103 to the user-reviewer interface system 170, the user-reviewer interface system 170 is able to track reviewer interaction with the enhanced document 151, and may notify the user 101 regarding the same. The user 101, for example, may be sent a notification with details regarding the reviewer's action (e.g., via an SMS message, e-mail message, notification via a mobile application, or notification via a user dashboard provided through document interaction platform 171). For example, in the job application context, a user 101 may be applying to several jobs and may be able to track the status of each application they submitted through a job search organizer or similar dashboard. In such cases, the user-reviewer interface system 170 may track the identity of the reviewer 103 (e.g., based on an IP address of the inbound request and/or a browser fingerprinting techniques, or based on login credentials provided by the reviewer 103), such that the user-reviewer interface system 170 is able to disambiguate between multiple reviewers 103 interacting with the same document.

In some instances, the user-reviewer interface system 170 may be able to detect when the reviewer 103 opens the enhanced document 151 itself, and may similarly notify the user 101 of the same. The interactive element 152 within the enhanced document 151, for example, may have an image uniquely associated therewith (i.e., serving as a unique element identifier), which may be hosted by the user-reviewer interface system 170. When the reviewer 103 opens the enhanced document 151 (e.g., in a word processing application), the image may be automatically retrieved (e.g., in order to visually render the document), thereby alerting the user-reviewer interface system 170 that the enhanced document 151 has been viewed. In some cases, the images may be hidden or otherwise obfuscated from view (e.g., being represented as a single-pixel, and/or having a transparent or low-contrast color), such that the reviewer 103 is unaware of the monitoring that is taking place.

In some embodiments, enhanced document creation system 110 may also be able to dynamically assign or update a hyperlink or URL associated with an enhanced document 151 according to actions taken by a reviewer or an external system, such as, for example, document review system 140 and/or document parsing system 130 associated with (or operating in conjunction with) document review system 140. For example, when an enhanced document 151 is viewed or processed by a previously untracked reviewer or external system, such as, for example, document review system 140 and/or document parsing system 130 associated with (or operating in conjunction with) document review system 140, enhanced document creation system 110 may generate a new hyperlink or URL associated with the enhanced document 151. The new hyperlink or URL associated with the enhanced document 151 may, thus, allow a user 101 to separately track information about the enhanced document 151, such as, for example, status, interactions by a reviewer, other statistics, etc., according to each reviewer and/or external system accessing or processing enhanced document 151. If a hyperlink or URL associated with the enhanced document 151 has been previously generated for the reviewer or external system, the existing hyperlink or URL may be replaced by the newly-generated hyperlink or URL.

For example, if enhanced document 151 is parsed by a document review system 140 and/or document parsing system 130 associated with (or operating in conjunction with) document review system 140, enhanced document creation system 110 may create a new hyperlink or URL associated with enhanced document 151. Enhanced document creation system 110 may do so in all such instances, or may prompt the user 101 to confirm that new a hyperlink or URL should be created. The default action may be controlled by user preferences or system policy.

Generation of a new a hyperlink or URL associated with enhanced document 151 may be performed in all cases of access by a review or processing of enhanced document 151, or may be limited according to user preferences or system policy. For example, preferences of user 101 may limit generation of a hyperlink or URL to a single such hyperlink or URL per employer or other organization with access to enhanced document 151. In another example, generation of a hyperlink or URL may be triggered when enhanced document 151 has been updated.

Example Method for Generating a Document Link for an Enhanced Document

Figure 12:
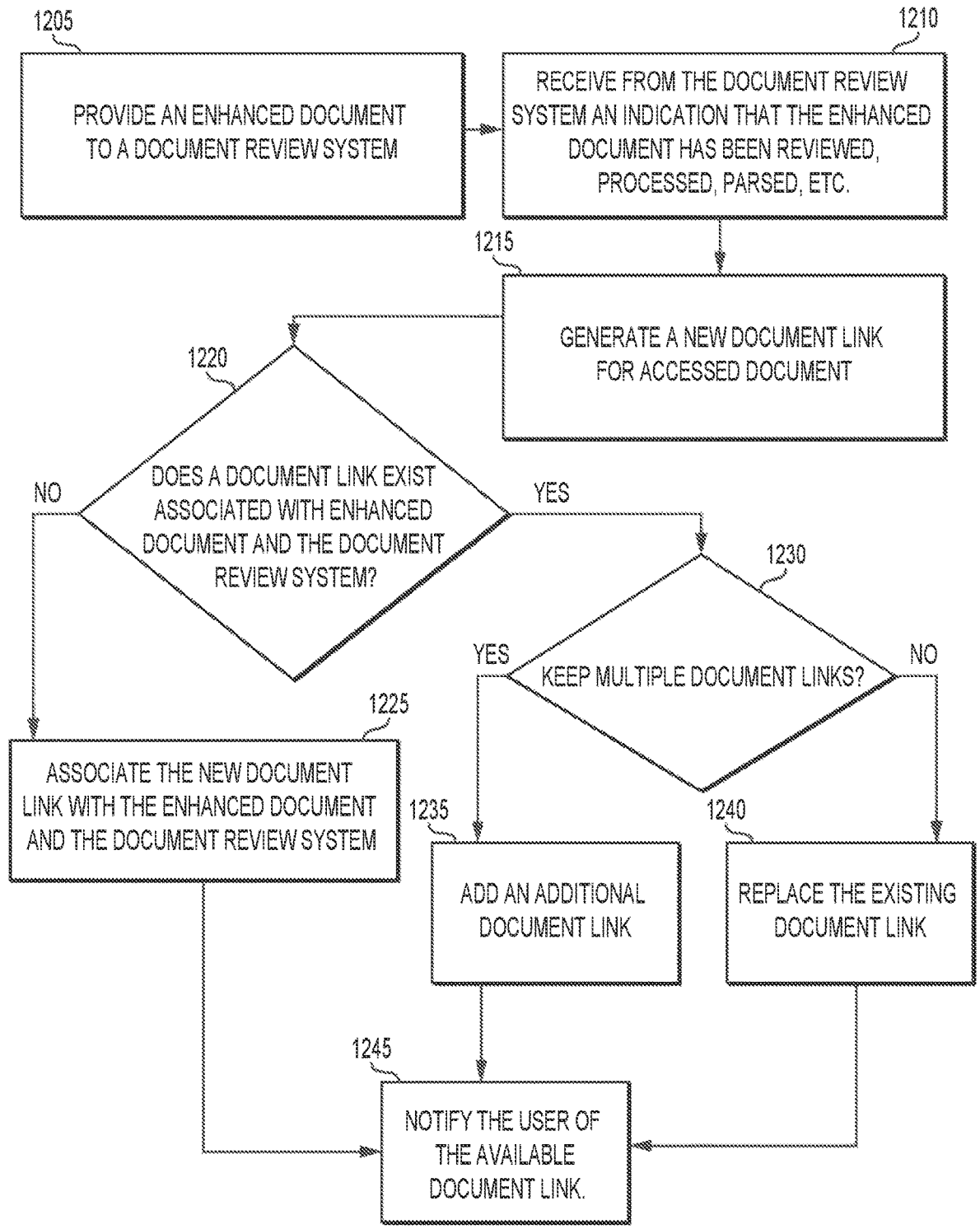
FIG. 12 depicts a flowchart of a method for generating a document link for an enhanced document, according to one or more embodiments shown and described herein.

FIG. 12 depicts a flowchart of a method for generating a document link for an enhanced document, according to one or more embodiments.

As shown in FIG. 12, at block 1205, the enhanced document creation system 110 may provide an enhanced document to a document review system. At block 1210, the enhanced document creation system 110 may receive from the document review system an indication that the enhanced document has been reviewed, processed, parsed, etc. At block 1215, enhanced document creation system 110 may generate a new document link for the accessed document. At block 1220, the enhanced document creation system 110 may determine whether a document link exists that is associated with enhanced document and the document review system. If a document link does not exist, then, at block 1225, enhanced document creation system 110 may associate the new document link with the enhanced document and the document review system. Enhanced document creation system 110 may then continue to block 1245. If a document link does exist, then, at block 1230, enhanced document creation system 110 may determine whether to keep multiple document links. If multiple document links should be kept, then, at block 1235, enhanced document creation system 110 may add an additional document link. Enhanced document creation system 110 may then continue to block 1245. If multiple document links should not be kept, then, at block 1240, enhanced document creation system 110 may replace the existing document link with the new document link. Enhanced document creation system 110 may then continue to block 1245. At block 1245, enhanced document creation system 110 may notify the user of the available document link(s).

In some embodiments, the interactive element 152 provided within the enhanced document 151 may be dynamic in nature. For example, as noted above, the interactive element 152 may be associated with a unique image hosted by the user-reviewer interface system 170, which may be requested from the user-reviewer interface system 170 (e.g., via a URL directed to an image or a script that returns image content). When the user-reviewer interface system 170 receives a request for the image, it may execute certain logic before ultimately returning the requested image. By way of example, an enhanced resume document may include an interactive element that provides a reviewer 103 with an updated version of the resume if one is available, where the interactive element takes the form of an image hosted by the user-reviewer interface system 170. When the interactive element is rendered, a request for the associated image may be sent to the user-reviewer interface system 170, which in turn, may determine when the particular image was last requested and whether the enhanced resume had since been updated by the reviewer. In some cases, the user-reviewer interface system 170 may return an image reflective of this determination (e.g., an "Updated Resume Available" image or a "Resume is Up to Date" image). As another example, the enhanced resume may include an interactive element that allows the reviewer 103 to contact the user 101. When the image associated with the interactive element is requested from the user-reviewer interface system 170, it may determine the communication preferences of the user 101 and return an image corresponding to the preferred method of contact (e.g., "E-mail Me," "Text Me," "Call Me," or the like). In this way, the interactive element 152 itself can serve as a notification to the reviewer 103.

Enhanced document creation system 110 may receive a request for a structured document from the document parsing system 130, and may, in response, generate a second unique document identifier, associate the structured document with the second unique document identifier, and embed the second unique document identifier as non-visible metadata in the rendered document to form a second enhanced document. The second enhanced document and the second unique document identifier may allow a user to separately track interactions with and/or processing of the enhanced document and the second enhanced document.

As noted above, the user 101 may be notified when a reviewer 103 opens or otherwise interacts with an enhanced document 151 or online document 155. The notification provided to the user 101 may also indicate whether additional action by the user 101 is required, and if so, may direct the user 101 to the document interaction platform 171, which may automatically trigger the execution of logic associated with the additional action. The user 101, for example, may be funneled through a series of prompts whereby the user 101 may provide the necessary information and/or input. The reviewer 103 may similarly be provided a notification with details of the user's action and whether further action by the reviewer 103 is required, and if so, may direct the reviewer 103 to the document interaction platform 171 to provide the requisite information and/or input. In this way, the user-reviewer interface system 170 is able to facilitate a back-and-forth exchange between the user 101 and reviewer 103.

By way of example, a recruiter may select a "Request References" interactive element in an enhanced document 151 or online document 155. But before this information is released to the recruiter, the job applicant must provide authorization. The recruiter may be prompted to enter identification information before sending the request to the job applicant. The job applicant, in turn, may be sent a notification indicating that a recruiter has viewed their resume and requested access to their references, and may prompt the job applicant to authorize or deny the request. Based on the applicant's selection, an appropriate notification may be sent to the recruiter. In doing so, the user-reviewer interface system 170 may maintain a state of communications between the user 101 and particular reviewer 103 (e.g., based on an IP address and/or browser fingerprint of the particular reviewer 103, or based on login credentials provided by the reviewer 103) with respect to a particular interactive element 152 and enhanced document 151, permitting multi-session user-reviewer engagement. The user-reviewer interface system 170 may also maintain a communication state for a user 101 and/or reviewer 103 individually, allowing for multi-session interactions more generally.

As noted above, the document submission system 160 may also pass the enhanced document 151 along to the document review system 140, which may automatically process the enhanced document 151 and present it to reviewer 103 through a document review portal 145 that reviewers 103 may interface with over the Internet 105 (e.g., using a web browser on reviewer device 104). In the job application context, for example, an ATS or other resume review system, may provide an application review portal through which a recruiter or HR employee may review job applications and resumes submitted by users 101 through the job application board. A number of commercial ATS solutions are available for such purposes, including offerings from Workday, Greenhouse, and other popular vendors.

The document review system 140 may process the documents in order to facilitate review of the documents and submissions by reviewer 103 through the document review portal 145. The document review system 140, for example, may automatically parse the enhanced document 151 to extract significant information therefrom, and may utilize document parsing system 130 in order to do so. The document review system 140 may use the extracted information to provide different functionality to the reviewer 103 through the document review portal 145, for example, allowing the reviewer 103 to search, or otherwise filter, the user submissions based on the extracted information.

Document review systems 140 also commonly provide a "preview" of the uploaded document within the document review portal 145 (e.g., in an HTML format), such that reviewer 103 does not need to download and open the document (i.e., as a stand-alone document). The user-reviewer interface system 170 may nevertheless be able to track the reviewer's interaction with the enhanced document 151 through the document review portal 145 (e.g., through the presence of a unique image, as discussed above, that is rendered in the "preview"). Furthermore, in cases where a reviewer 103 is relying on a preview of the enhanced document 151 provided through the document review portal 145, the previously described functionality of the user-reviewer interface system 170 and document interaction platform 171 may be provided within the document "preview" presented to the reviewer 103 in the document review portal 145 itself. The reviewer 103, for example, may be re-directed to an external website or prompted for additional information within the document review portal 145 itself.

In some cases, the document review system 140 may have an arrangement or relationship with the enhanced document creation system 110 and/or user-reviewer interface system 170, which may allow the document review system 140 to take further action when presenting the "preview" through the document review portal 145. The document review system 140, for example, may alter the "preview" based on the interactive elements 152 contained within an enhanced document 151. For instance, as discussed above, interactive elements 152 may be dynamic in nature and the document review system 140 may adjust the "preview" based on the information conveyed by the interactive element. By way of example, where an interactive element 152 indicates that an updated version of the enhanced document 151 is available, the document review system 140 may automatically retrieve the updated document (e.g., from enhanced document creation system 110) and present the updated document in the "preview."

Furthermore, while the document review system 140 may generate the document "preview" itself, in some cases, it may instead rely upon a document "preview" returned by the document parsing system 130 upon parsing of the enhanced document 151. Accordingly, in instances where document parsing system 130 is able to parse the enhanced document 151 by extracting an embedded document identifier and obtaining encoded content associated therewith from enhanced document creation system 110, better control over the document "preview" is possible and improved functionality may be provided. For instance, in rendering the document "preview" by the document review system 140, the appearance and functionality of the interactive elements 152 may become malformed (e.g., preventing the selection of the interactive elements 152, or eliminating them from the document "preview" altogether). The enhanced document creation system 110, however, may be able to ensure that the encoded content that is returned to the document review system 140 is appropriately formatted such that interactive elements 152 are properly rendered for display in the document review portal 145. As another example, the enhanced document 151 may become a living document, with the enhanced document creation system 110 being able to return an updated version of the enhanced document 151 which may contain additional or more accurate information.

The enhanced document creation system 110 may also be able to dynamically assign or update a hyperlink or URL associated with a particular interactive element 152, such that it can be uniquely associated with a particular document submission. For example, in the job application context, the resume creation platform, when returning encoded resume content, may dynamically assign unique hyperlinks for each interactive element 152 in the enhanced resume, such that they may be associated with a particular job application for which the enhanced resume was submitted and/or ATS in which the enhanced resume is being reviewed. In this way, the user-reviewer interface system 170 may be able to uniquely track interaction with the enhanced document 151 with respect to each of the many particular job applications a user 101 may have submitted. The enhanced document creation system 110 may also dynamically assign or updated a hyperlink or URL associated with different sections of the online document 155, particularly those that are linked by interactive elements 152. The user can then view aggregated statistics related to each URL. For example, an enhanced document 151 may comprise a plurality of interactive elements 152, with each being associated with a unique URL. Because each URL is unique, the user 101 can view analytics related to each employer such as number of views, dates accessed, number of interactive elements clicked, etc. for each enhanced document 151, online document 155, or interactive elements 152 via a user dashboard.

In some instances, the document review portal 145 may itself seek to provide similar functionality to those provided by the interactive elements 152 of the enhanced document 151 (e.g., providing a "Schedule an Appointment" feature), but would not otherwise have the benefit of any underlying information provided by the user 101 when adding the interactive element 152. In such cases, the document review portal 145 may be able to interface directly with the user-reviewer interface system 170 (e.g., through a plug-in or extension installed at the document review system 140), with the document interaction platform 171 serving to replace or complement the document review portal 145 interface. By way of example, when a reviewer 103 selects a "Schedule an Interview" within an ATS, a request may be sent to the user-reviewer interface system 170 requesting information regarding the user's availability for an interview (e.g., to a public facing service of the user-reviewer interface system 170). The user-reviewer interface system 170 may retrieve information regarding the user's availability (e.g., from the user-reviewer data database 217 of the enhanced document creation system 110), and return this to the ATS, which may then open the reviewer's calendar and display user's schedule. An even tighter integration (e.g., through a plug-in or extension installed at the document review system 140), may allow interactive elements 152 to be presented directly within the document review portal 145, regardless of whether the document review portal 145 provides a similar feature.

Further still, as noted above, the user 101 may be able to select or add interactive elements 152 to be made available to the reviewer 103 but would not be included as visible elements within the enhanced document 151 itself. The document review system 140, for example, may be able to request a list of all available interactive elements 152 associated with an enhanced document 151 that has been submitted from the enhanced document creation system 110 (e.g., by invoking a public facing API and passing the exported document identifier embedded within the enhanced document 151). The document review system 140 can make all of the returned interactive elements 152 available to the reviewer 103, for example, as part of the document "preview" and/or directly within the document review portal 145 (e.g., through a plugin or extension installed at the document review system 140).

As noted above, the document review system 140 may have an arrangement or relationship with the enhanced document creation system 110 and/or user-reviewer interface system 170, which may also allow for improved interaction between the user 101 and reviewer 103. The enhanced document creation system 110 and/or user-reviewer interface system 170, for example, may provide a public facing service through which the document review system 140 may automatically receive, or selectively retrieve, status notifications. The statuses may be generic status updates for the user 101, status updates with respect to a particular initial document 150, enhanced document 151, or online document 155, or a particular document submission, and may be provided by the user 101, or the enhanced document creation system 110 and/or user-reviewer interface system 170. For example, in the job application context, the status notification could indicate that an updated resume is available, that the contact information, availability (e.g., number of hours or shifts), or salary requirements for the user 101 has been updated, that new certifications have been added, transcripts are available, or that new references are available, that a background check has been completed, or the like. The user 101 may be able to modify and/or delete statuses. In some cases, the ability to modify statuses may only be possible where the status notification has not been delivered to or read by the document review system 140.

The enhanced document creation system 110 and/or user-reviewer interface system 170, for example, may provide SubscribeClient and CheckSubmissionStatus methods to the document review system 140. The SubscribeClient function may allow the document review system 140 to subscribe to receive or request status notifications or messages tailored by the user 101 for a particular submission of an enhanced document 151 (e.g., the submission of a particular enhanced resume for a specific job opening). As part of the subscribe request, the document review system 140 may provide an enhanced document identifier, identifying the enhanced document 151 for which the system is subscribing, and a submission description to identify the document review system 140 and the context of the document submission. For example, in the job application context, the submission description may contain an employer name, job title, and an application date. The submission description may also contain a unique job identifier and user identifier (i.e., unique to the document review system 140), as well as a job posting date, hiring department, location, recruiter and manager. By way of example: "JobApplication": {{"jobRequisitionKey": "45F8L250YH", "employerName": "Acme Corporation Inc.", "jobTitle": "Pyrotechnics Engineer", "applicationDate": "2021-03-20", "applicantKey": "148219671", "openDate": "2021-03-13", "department": "Engineering", "location": "Phoenix, AZ", "recruiter": "Human Resources", "hiringManager": "W. E. Coyote"}}. In response to a valid subscribe request, the enhanced document creation system 110 and/or user-reviewer interface system 170 may return a unique document submission identifier (i.e., unique within the enhanced document creation system 110 and/or user-reviewer interface system 170), which the document review system 140 may then use to check status information provided by the user 101 with respect to that submission.

The subscribe request may also indicate whether the document review system 140 would like to actively receive notifications or whether it would prefer to selectively retrieve the notifications. In the case of the active notifications, the document review system 140 may additionally provide a notification URL as part of the subscribe request, to which the enhanced document creation system 110 and/or user-reviewer interface system 170 will "push" notifications as and when they occur (e.g., when an applicant sets their status or some other information becomes available to the document review system 140). A push notification message may include the document submission identifier and user identifier, as well as a notification identifier, a notification type, and the substance of the notification. In some cases, the status notification may also include a hyperlink (e.g., to the user-reviewer interface system 170) through which a reviewer 103 may take action. By way of example: "DocumentSubmissionNotification": {{"notificationID": "c544f1b8", "document submission ID": "025f7f8b", "user ID": "148219671", "notificationType": "Status Update", "statusText": "Student transcripts now available.", "calltoActionText": "View Transcripts", "calltoActionURL":

"https://cv.userreviewerinterface.com/025f7f8b?transcript", "Timestamp": "2021-03-21 19:04:24"},}.

The CheckSubmissionStatus method, likewise, may be used by the document review system 140 to determine a status set by the user 101 with respect to a particular document submission, which may be identified as part of the method request (e.g., by passing a document submission identifier). In response to a CheckSubmissionStatus request, the enhanced document creation system 110 and/or user-reviewer interface system 170 may return the latest status set by the user 101 or the last n number of statuses set by the user 101 for an associated document submission, which may be specified as part of the request.

In some embodiments, the enhanced document creation system 110 and/or user-reviewer interface system 170 may track the read or unread status associated with a request. In such cases, the enhanced document creation system 110 and/or user-reviewer interface system 170 may return the number of unread statuses and/or only return unread statuses in response to a CheckSubmissionStatus request. By way of example: "submissionStatuses": {"totalRecordsAvailable": "5", "unreadRecordsAvailable": "0", "numRecordsReturned": "2", {"notificationID": "fc8d61e8-2df1-4881-a53f-ca5509db77a0", "statusText": "Seeking full-time employment", "Timestamp": "2021-03-13 08:21:55"}, {"notificationID": "f3be5851-492a-4852-98a7-ad7f5b6b32b7", "statusText": "I've been hired. No longer on the market.", "Timestamp": "2021-03-21 19:04:24"}}.

In some cases, the CheckSubmissionStatus method may allow the document review system 140 to specify that previously unread statuses should be marked as read by the enhanced document creation system 110 and/or user-reviewer interface system 170. Alternatively, or additionally, the enhanced document creation system 110 and/or user-reviewer interface system 170 may provide a MarkNotificationRead method to mark a particular notification being read, for example, based on a notification identifier submitted with the method request.

In some embodiments, it may only be necessary to receive status notifications with respect to a particular enhanced document 151. In such cases, the CheckSubmissionStatus method may be replaced with a CheckDocumentStatus method, which may only return information and statuses at a global or document level.

A person of skill in the art would also appreciate that the described services could be extended to support the methods of integration discussed previously. For example, as discussed above, the document review system 140 may be able to request a list of all available interactive elements 152 associated with a particular submission of an enhanced document 151.

Enhanced Document Creation System

FIG. 2 provides a more detailed view of the enhanced document creation system 110, document submission system 160, document review system 140, document parsing system 130, user-reviewer interface system 170 and their constituent components.

As illustrated, the enhanced document creation system 110 may include one or more communication interfaces 211 (e.g., a WiFi communication interface or a LAN interface), one or more processors 212, a memory 213, a storage device 114, which may contain document skin library 114a, and one or more databases, including user-reviewer data database 217, document database 216, element definition database 215, user database 218, and online document database 219.

The memory 213 may include document creation platform logic 220, element service logic 224, document encoding logic 221, desensitization logic 222, rendering logic 223, and embedding logic 225, which processor(s) 212 may utilize to provide the system functionality discussed above and described in further detail below.

Document creation platform logic 220, for example, may allow the enhanced document creation system 110 to provide a document creation platform 180 through which a user 101 may create an initial document 150. The enhanced document creation system 110, for example, may utilize document creation platform logic 220 to present a website to the user 101 with fillable form elements or fields that a user 101 may fill out, select, or otherwise complete.

For example, document creation platform logic 220 may present the user with a resume building tool, which may prompt a user to select a resume template, or may select a resume template automatically based on one or more attributes of the user 101, which may be stored in user database 218 (e.g., as part of a user profile). Based on the selected template, the document creation platform logic 220 may then generate a resume form, with one or more empty sections having one or more fields or other form elements for the user 101 to complete. The sections, for example, may be directed toward the user's personal identification information, educational background, job experience, or the like. As another example, the document creation platform 180 may present the user 101 with a list of sections that a user 101 may select to include in the initial document 150. In some instances, the resume form may be dynamic in nature, for example, allowing a user to add or remove sections (e.g., for each college or university attended, or each job they have held). Through the document creation platform 180, user 101 may choose a section or paragraph to edit, and may be presented with a text entry form for that section or paragraph. User 101 may then modify the text and adjust formatting inputs (e.g., positioning, style, etc.) for the section. Alternatively, in some cases, the document creation platform 180 may limit the user's ability to adjust formatting, (e.g., relying on a document skin instead), so as to maintain a uniform appearance of the document (including any interactive elements 152)

The document creation platform 180 may additionally (or alternatively) allow the user 101 to provide an existing un-enhanced document, which the enhanced document creation system 110 may parse using parsing software. The information extracted by parsing the document may be analyzed by document creation platform logic 220 to identify the presence of one or more sections, and to seed or pre-populate the fillable form elements of the initial document 150 corresponding to the identified sections (or create a new pre-populated initial document 150 having the identified sections). User 101 may then be able to edit the document content, for example, to correct any errors or omissions resulting from the automated parsing of an un-enhanced document.

The document creation platform 180 may also allow the user 101 to add or include one or more interactive elements 152. Document creation platform logic 220, for example, may allow the user to add an interactive element section to the initial document 150 and may present the user 101 with a set of available interactive elements 152 to choose to include in the section. The user 101 may then choose one or more interactive elements 152 to add to the initial document 150. In doing so, user 101 may be directed to a document interaction platform 171 hosted by the user-reviewer interface system 170, which, in turn, may trigger the execution of logic associated with the interactive element 152 that was selected. The user-reviewer interface system 170, for example, may prompt the user 101 to enter information needed to execute the associated logic.

In some embodiments, the document creation platform 180 may allow the user 101 to designate whether interactive elements 152, individually or collectively, should appear when the interactive enhanced document 151 is physically printed. In other embodiments, the user 101 may be able to select interactive elements 152 that they wish to be optionally available to reviewer 103. These interactive elements 152 may be included as encoded document content (e.g., to be embedded as non-visible metadata within an enhanced document 151, or returned by the enhanced document creation system 110 in response to a request for the encoded content associated with an exported document identifier embedded in an enhanced document 151), but may not be visible within the document. Alternatively, the interactive elements 152 may be included in the visible portion of the document but may nevertheless be hidden or obfuscated from identification and inspection by a human reviewer (e.g., being represented by a single-pixel image, and/or transparent or low-contrast color).

In some embodiments, the document creation platform 180 may provide the user with the ability to save the initial document 150 in a particular state in document database 216, and may utilize document encoding logic 221 in order to do so. Document encoding logic 221, for example, may be used to encode the initial document 150 as structured data according to a defined schema (e.g., a proprietary or standardized XML or JSON schema) based on a known semantic meaning of each form element, and by association, the content therein. Document encoding logic 221, for instance, may map each section or paragraph of the resume completed by the user 101 to specific elements and fields within the defined schema. By way of example, a work history section of a resume may contain a record of a user's employment, with a paragraph or sub-section corresponding to each position the user 101 has held. Each position may further contain elements corresponding to the name of the employer, the dates of employment, and description of experience. Based on the semantic meaning of each element (e.g., as falling within a work history section or calling for an employer name) document encoding logic 221 may be able to encode the content entered by the user as structured data according to a structured schema. Document encoding logic 221 notably may encode each interactive element 152 as structured data (e.g., including an "ID," "Label," "URL," as well as optional attributes such as "Available," "Print," or the like).

Document encoding logic 221 may store the encoded document in document database 216. In some embodiments, document encoding logic 221 may encode and store the initial document 150 based on a user input provided through the document creation platform 180 (e.g., by clicking a save interactive element). While in others, document encoding logic 221 may encode and store each form element of the initial document 150 in real-time, as completed by the user (e.g., when a form element goes out of focus). In this way, the document creation platform 180 may maintain a state of the initial document 150, and allow the user 101 to update and revise the document over multiple sessions. The encoded document may be stored in document database 216 in association with a document identifier, which may serve as a version identifier for particular instances of the encoded document.

Document encoding logic 221 may also allow the enhanced document creation system 110 to translate encoded data from one schema to another. Document encoding logic 221, for example, may be able to translate document content encoded according to a proprietary schema used by document creation platform 180 into a standardized schema (e.g., HR-JSON or HRXML schemas promulgated by the HR Open Standards Consortium) or other schema used by document submission system 160 and/or document parsing system 130.

Desensitization logic 222 may allow the enhanced document creation system 110 to desensitize an encoded document so as to ensure that no sensitive user information (e.g., SSN, photograph, personal identification information, etc.) is included when rendering and exporting the enhanced document 151. The desensitization logic 222, for example, may process an encoded document (i.e., after the initial document 150 has been encoded and stored in document database 216) and mark any sensitive user information to be excluded prior to rendering the encoded document.

Rendering logic 223 may allow the enhanced document creation system 110 to render an encoded (and optionally desensitized or translated) document in a particular file format (e.g., Microsoft Word's DOCX format or Adobe Acrobat's PDF format), which in some embodiments, may be specified by a user 101. The rendering logic 223, for example, may be used to generate an intermediate file from the encoded content, where the visual appearance of the document content (i.e., the positioning and style of the document content) may be provided by a skin definition associated with initial document 150, which may be stored and retrieved from document skin library 114a, and interactive elements 152 may be provided by a skin definition associated with each interactive element 152, which may be stored and retrieved in an element skin library. The enhanced document creation system 110, for example, may generate an HTML file comprising different HTML elements, with specified CSS styles, along with a CSS stylesheet (e.g., linked, inline, etc.) to control the position and style (i.e., the visual appearance) of the document content. The enhanced document creation system 110 may then convert the intermediate file into a particular file format, like Microsoft Word's DOCX format or Adobe Acrobat's PDF format. In doing so, the enhanced document creation system 110 may make use of publicly available conversion libraries, like Aspose (for HTML to DOCX conversion) or ABCpdf (for HTML to PDF conversion).

As discussed above, in some embodiments, the enhanced document creation system 110 may seek to ensure that the enhanced document 151 can be completely and accurately parsed, namely by using embedding logic 225 to embed the encoded document content, or an exported document identifier associated with the encoded document content, as non-visible metadata in the rendered document. Some file formats may place limitations on the form in which the nonvisible metadata may be written to the converted document, for example, requiring ID-value pairs or limiting the size or length of the value (e.g., to strings of less than 255 characters in length, etc.). Embedding logic 225 may allow the enhanced document creation system 110 to determine the file format of the converted document, and manipulate the byte string so as to conform with any limitations the format may place on non-visible metadata stored therein.

Element service logic 224 may allow the enhanced document creation system 110 to provide an element service to help support the user-reviewer interface system 170 and its document interaction platform 171. Element service logic 224, for example, may provide the logic executed by the user-reviewer interface system 170 for a particular interactive element 152, along with any information necessary for supporting this logic. The enhanced document creation system 110, for example, may maintain an element definition database 215 containing element definitions for each interactive element 152.

The element definition, for example, may define one or more steps or series of steps to be performed in executing a particular interactive element 152, along with the various inputs and parameters needed for each step. By way of example, a Schedule Interview element definition may define an initial set of scheduling parameters to be provided by the user 101, the logic that the document interaction platform 171 may follow to obtain this information from the user 101 (e.g., logic regarding the prompts that are to be presented to the user 101 to solicit the required information), a responsive set of scheduling parameters to be provided by the reviewer 103, the logic that the document interaction platform 171 may follow to obtain this information from the reviewer (e.g., logic regarding the prompts that are to be presented to the reviewer 103 to solicit the required information), and a function or service call to be made once all of the parameters have been obtained (e.g., a Google Calendar API to be called to schedule the appointment for the user 101 and reviewer 103). As the different parameters are obtained through the document interaction platform 171 (e.g., through the prompts presented to user 101 and/or reviewer 103), they may be passed back to the enhanced document creation system 110, where element service logic 224 may operate to store and/or update user-reviewer data database 217 accordingly. Element service logic 224, similarly, may provide information and/or parameters stored in user-reviewer data database 217 to the user-reviewer interface system 170 as necessary.

The document submission system 160 may include one or more communication interfaces 261 (e.g., a WiFi communication interface or a LAN interface), one or more processors 262, a memory 263, and a storage device 264. The memory 263 may include document submission platform logic 265, which processor(s) 262 may utilize to provide a document submission platform 190 as discussed above.

The document review system 140 may include one or more communication interfaces 241 (e.g., a WiFi communication interface or a LAN interface), one or more processors 262, a memory 243, and a storage device 244. The memory 243 may include document review portal logic 245, which processor(s) 242 may utilize to provide the system functionality discussed above with respect to document review portal 145.

The user-reviewer interface system 170 may include one or more communication interfaces 271 (e.g., a WiFi communication interface or a LAN interface), one or more processors 272, a memory 273, and a storage device 274. The memory 273 may include document interaction portal logic 275, which processor(s) 272 may utilize to provide the system functionality discussed above with respect to the document interaction platform 171.

The document parsing system 130 may include one or more communication interfaces 231 (e.g., a WiFi communication interface or a LAN interface), one or more processors 232, a memory 233, and a storage device 234. The memory 233 may include metadata extraction logic 235 and decoding logic 238, which processor(s) 232 may utilize to provide the system functionality discussed above and described in further detail below.

Metadata extraction logic 235 may allow the document parsing system 130 to extract metadata embedded within an enhanced document 151. The document parsing system 130, for example, may extract the embedded metadata from the enhanced document 151 to obtain a single extracted byte string. Where the metadata consists of a series of ID-value pairs, document parsing system 130 may first concatenate the values in sequence (e.g., based on the IDs) to form the single extracted byte string.

In instances where an exported document identifier was embedded in the enhanced document 151, the metadata extraction logic 235 may contact the enhanced document creation system 110 to request the encoded content (i.e., associated with the exported document identifier) that was initially stored by the enhanced document creation system 110 when the document was exported. The document parsing system 130, for example, may be able to query the enhanced document creation system 110 by invoking a public facing API and passing the exported document identifier along with other request parameters. The request, for example, may indicate the desired format in which encoded content should be returned and/or include a license key authorizing the document parsing system 130.

Further, the API may be used to query additional sections or updates from the online document 155 corresponding to an enhanced document 151. The user 101 can designate what information is made available to send along with the parse call. The information may be limited by the enhanced document 151 version or on a reviewer-by-reviewer basis.

The document parsing system 130 may attempt to extract embedded metadata from a received document automatically, under the assumption that it is an enhanced document 151, or it may first detect whether a received document is an enhanced document 151, for example, based on an indicator (e.g., a keyword or phrase, symbol, graphic, or the like) provided in the visible portion of the document. In some instances, the indicator while appearing in the visible portion of the document may nevertheless be hidden or obfuscated from identification and inspection by a human reviewer (e.g., by using a small font size, and/or transparent or low-contrast color). The document parsing system 130 may also determine whether the extracted byte string represents the encoded content itself or an exported document identifier and may process the extracted metadata accordingly.

In some embodiment, the enhanced document 151 may comprise an embedded/hidden link to a corresponding online document 155. Because the online document 155 is generally more up to date, the document parsing system 130 may receive the parsed information directly from the online document creation system. The enhanced document 151 may also comprise directions for calls to other public facing APIs of related websites such as LinkedIn or YouTube.

Decoding logic 238, in turn, may allow the document parsing system 130 to decode the extracted and optionally decrypted content, and may provide the resulting structured data to document submission system 160 as needed. In some cases, the document parsing system 130 may process the extracted content in order to place it in a form expected by a document submission system 160 (e.g., based on a mapping of some or all of the fields and elements of the defined schema to another schema used by the document submission system 160).

Example Method for Creating an Initial Document

Figure 3:
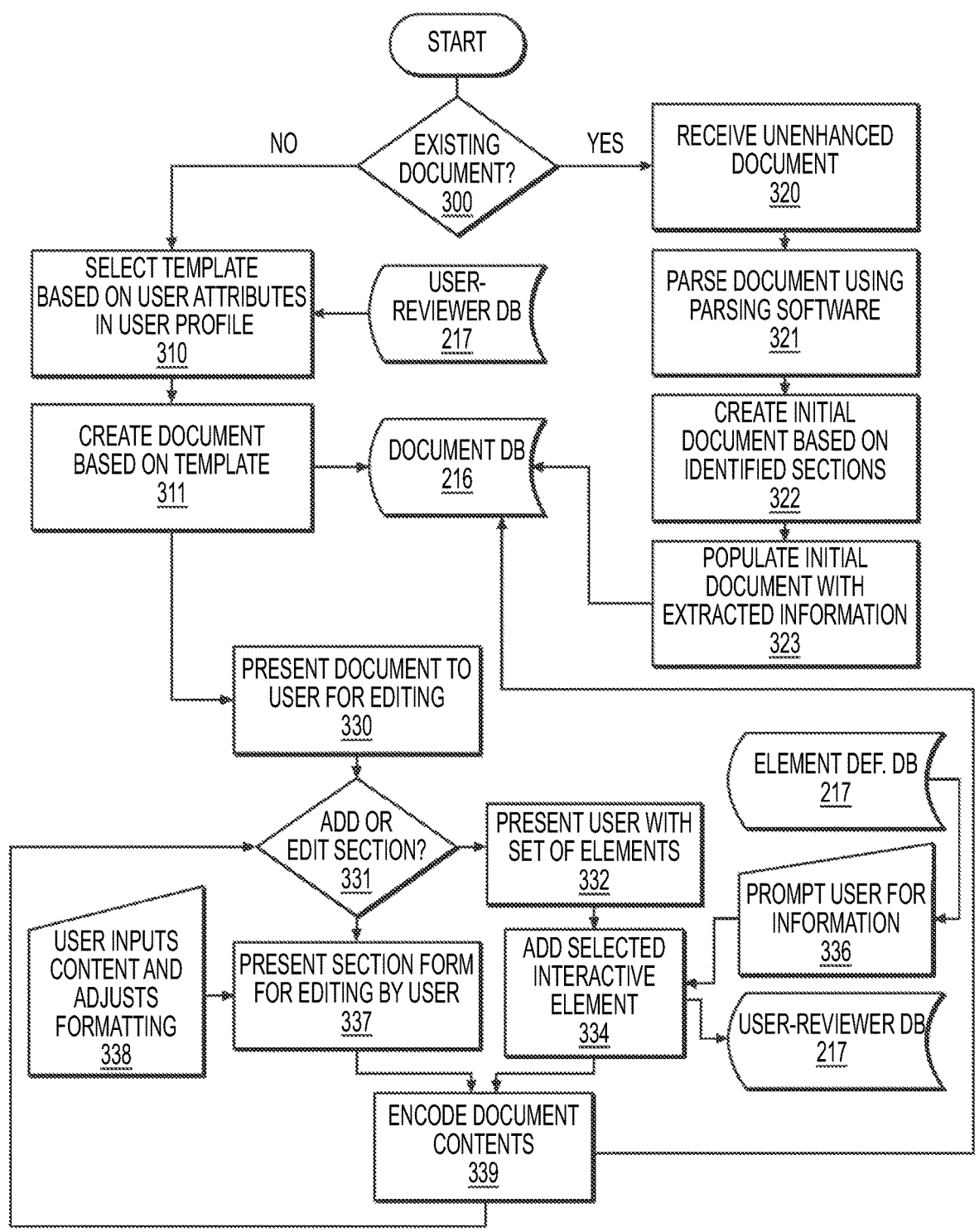
FIG. 3 depicts a flowchart of a method for creating an interactive document, according to one or more embodiments shown and described herein.

FIG. 3 depicts a flowchart of a method for creating an initial document 150, according to one or more embodiments. The process may begin with a determination of whether the user 101 would like to create a new document or work from an existing document, for example, based on a user input provided through a document creation platform 180, at block 300. If the user 101 decides to create a new document, the enhanced document creation system 110 may select a document template based on one or more user attributes in a user profile associated with the user 101, which may be retrieved from user database 218, at block 310. The enhanced document creation system 110 may create an initial document 150 in accordance with the selected template, which may be encoded in accordance with a defined schema and stored as a structured document in document database 216, at block 311.

Alternatively, if the user 101 decides to work from an existing document, the user 101 may upload an unenhanced document through document creation platform 180, at block 320. The enhanced document creation system 110 may parse the document using document parsing software to extract information from the unenhanced document, at block 321. The enhanced document creation system 110 may analyze the extracted information to determine the presence of one or more sections in the uploaded document, and may create an initial document 150 having equivalent sections, at block 322. The initial document 150 may be encoded in accordance with a defined schema and stored as a structured document in document database 216 in association with a unique document identifier. The enhanced document creation system 110 may also populate the sections within the initial document 150 with information extracted using the parsing software, at block 323. The enhanced document creation system 110 may encode the populated sections according to the defined schema and update the structured document in document database 216 and may assign a new document identifier.

The enhanced document creation system 110 may then present the initial document 150 to the user 101 through document creation platform 180 for the user 101 to view or further modify, at block 330. The user 101, for example, may have the ability to choose to add or edit one or more sections of the initial document 150, at block 331. If the user elects to add or edit an interactive elements 152 section, the user may be presented with a set of available interactive elements 152 to choose from, at block 332. Based on the user's selection, the document creation platform 180 may add one or more interactive elements 152 to the initial document 150, at block 334, retrieving corresponding element definitions from element definition database 215 and prompting the user 101 for any underlying information necessary to support the functionality of the interactive elements 152 in the process, which may then be stored in user-reviewer data database 217, at block 336. Alternatively, if the user 101 chooses a different section (without any interactive elements 152), the enhanced document creation system 110 may present the user 101 with a form corresponding to the section for the user 101 to edit, at block 337. The user 101 may edit the contents and formatting of the section through the form presented to the user 101, at block 338. Once complete, the enhanced document creation system 110 may encode the section and update the structured document in document database 216 accordingly, at block 339. This process may continue until a determination is made that the user 101 is finished editing the document, at block 331.

Example Method for Exporting an Enhanced Document

Figure 4:
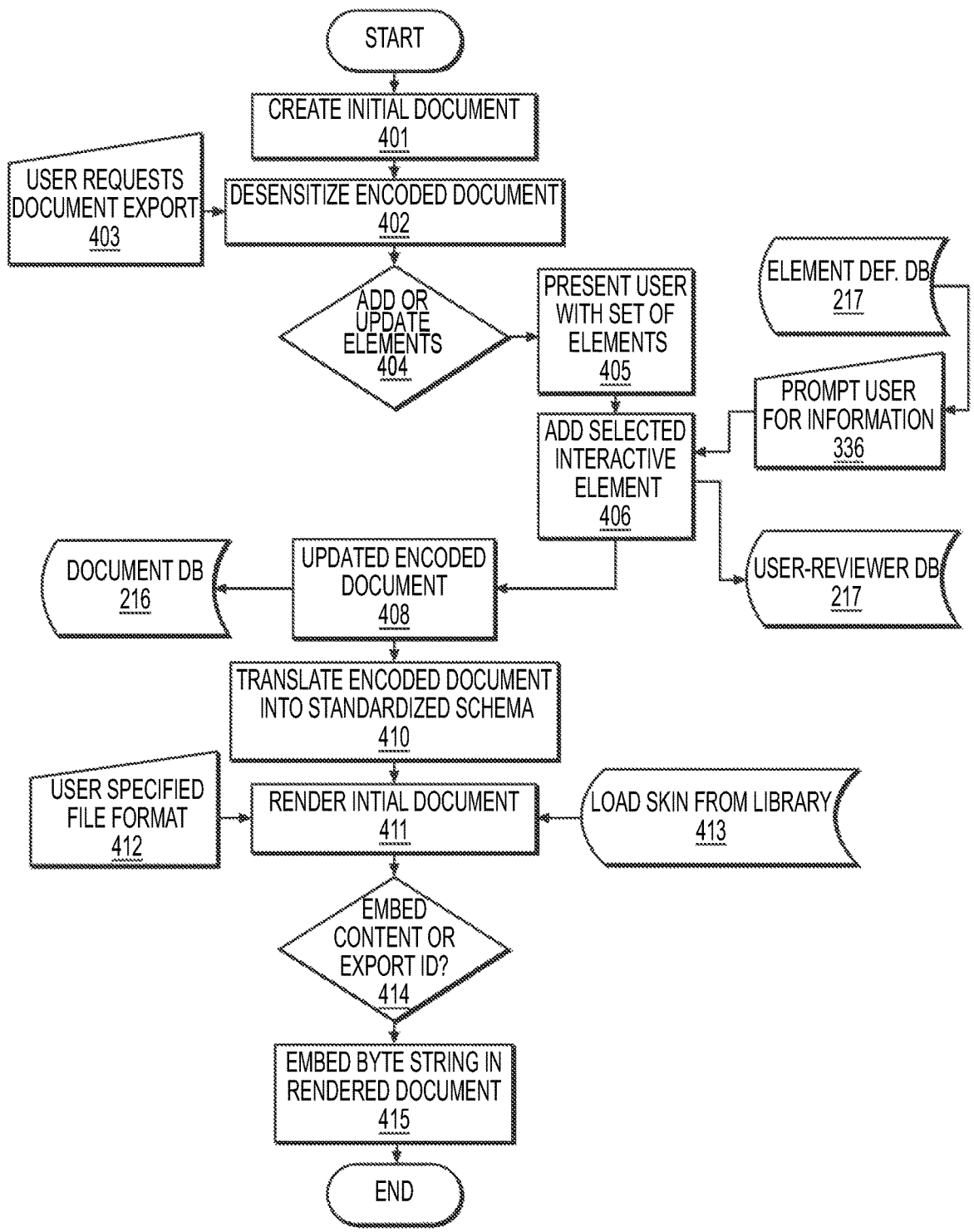
FIG. 4 depicts a flowchart of a method for exporting an enhanced interactive document, according to one or more embodiments shown and described herein.

FIG. 4 depicts a flowchart of a method for exporting an enhanced document 151, according to one or more embodiments. The process may begin with the creation of an initial document 150 via the document creation platform 180 provided by the enhanced document creation system 110, which may be encoded in accordance with a defined schema and stored as a structured document in document database 216 in association with a unique document identifier, at block 401. In response to a user request to export the initial document 150, at block 403, the enhanced document creation system 110 may retrieve the structured document from document database 216 and desensitize the document by removing any sensitive information (e.g., SSN, photograph, etc.), at block 402. The enhanced document creation system 110 may then ask the user 101 whether they wish to add or update any interactive elements 152 in the document or whether they have been finalized, at block 404. If the user 101 decides to add or update interactive elements 152, the user may be presented with a set of available or existing interactive elements 152 to choose from, at block 405. Based on the user's selection, the document creation platform 180 may add one or more interactive elements 152 to the initial document 150, at block 406, retrieving corresponding element definitions from element definition database 215 and prompting the user 101 for any underlying information necessary to support the functionality of the interactive elements 152 in the process, which may then be stored in user-reviewer data database 217. Once complete, the enhanced document creation system 110 may encode the section and update the structured document in document database 216 accordingly, at block 408.

The enhanced document creation system 110 may then translate the structured and desensitized document into a target schema, at block 410. The enhanced document creation system 110 may use this desensitized document to render the initial document 150 in a particular file format (e.g., Microsoft Word's DOCX format or Adobe Acrobat's PDF format), at block 411, which in some embodiments, may be designated by a user 101, at block 412. The initial document 150 may be rendered in accordance with a particular document skin definition, which may be loaded from document skin library 114a, at block 413. The enhanced document creation system 110 may then determine whether to embed the structured document in the rendered document (created at block 411) or whether to embed the document identifier associated with the structured document, at block 414. The structured document or document identifier associated therewith may then be embedded as a byte string in the rendered document (created at block 411) forming the enhanced document 151, at block 415.

Example Method for Parsing an Interactive Enhanced Document

Figure 5:
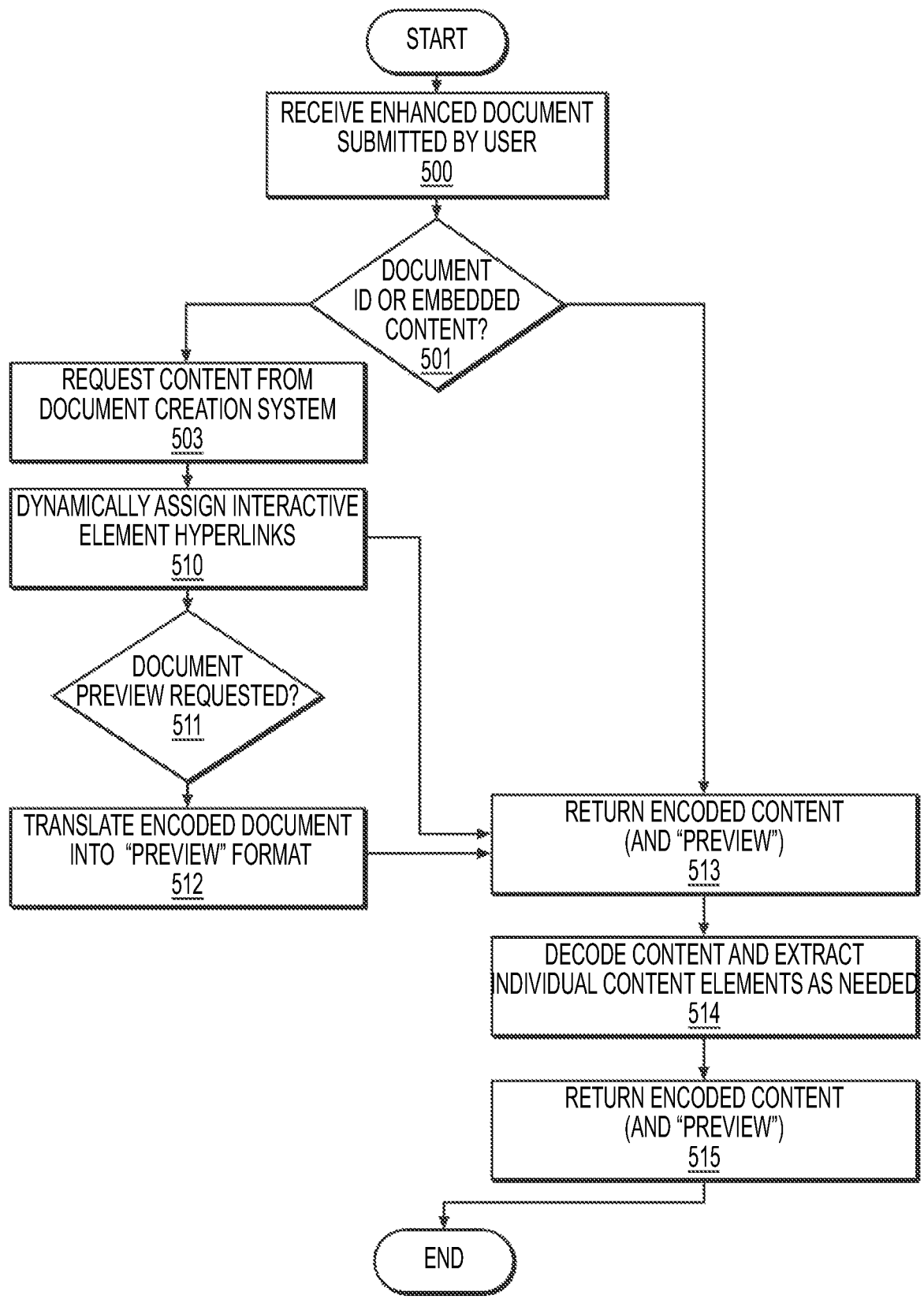
FIG. 5 depicts a flowchart of a method for parsing an enhanced interactive document, according to one or more embodiments shown and described herein.

FIG. 5 depicts a flowchart of a method for parsing an interactive enhanced document 151, according to one or more embodiments. The process may begin with the receipt of an enhanced document 151 from document submission system 160 for parsing by document parsing system 130, at block 500. The document parsing system 130 may then determine whether the received document is in fact an enhanced document 151 whether it has an exported document identifier embedded therein, at block 501. If so, the document parsing system 130 may extract the exported document identifier and request the associated structured document from the enhanced document creation system 110, at block 503.

In response to the request, the enhanced document creation system 110 may retrieve the encoded document content associated with the identifier, and dynamically assign unique URLs to any interactive element 152 encoded therein, at block 510. The enhanced document creation system 110 may also determine whether a document "preview" format (e.g., an HTML or RTF output) has been requested, at block 511, and if so, may translate the encoded document content with dynamically assigned URLs into the requested document "preview" format, at block 512. The enhanced document creation system 110 may then return the encoded document content with dynamically assigned URLs and, optionally, the document "preview" to document parsing system 130, at block 513. Document parsing system 130 may decode the encoded document content and extract individual content elements as needed, at block 514, which may be returned to the document review system 140 (optionally) with the document "preview", at block 515.

Example Method of a User-Reviewer Interaction Process

Figure 6:
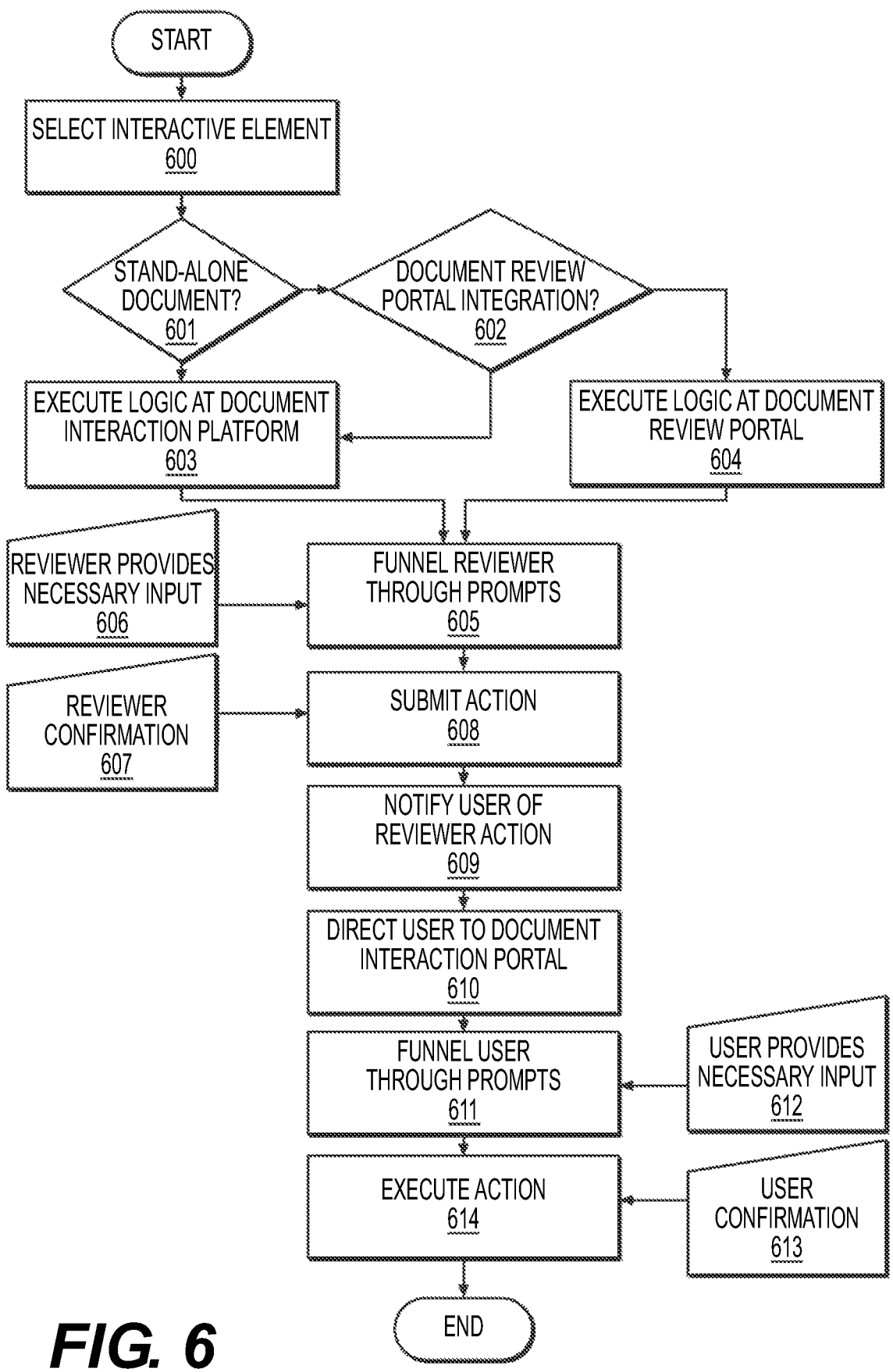
FIG. 6 depicts a flowchart of a method for a user reviewer interaction process, according to one or more embodiments shown and described herein.

FIG. 6 depicts a flowchart of a method for a user-reviewer interaction process, according to one or more embodiments, which may begin with a reviewer 103 selecting an interactive element 152 of an enhanced document 151 to take the action associated therewith, at block 600. A determination is made as to whether the reviewer 103 made the selection from a stand-alone resume or from within a document review portal 145 hosted by the document submission system 160, at block 601, and if the latter, whether the document review portal 145 supports some form of interactive element 152 integration (e.g., has an appropriate plug-in or extension installed), at block 602. If the request was initiated from a stand-alone document or the document review portal 145 does not support integration of the interactive element 152, the reviewer 103 may be directed to a document interaction platform 171 hosted by the user-reviewer interface system 170, at block 603. Alternatively, the interactive element functionality may be triggered within the document review portal 145 itself, at block 604.

The reviewer 103 may then be funneled through a series of prompts soliciting any additional information or input from the reviewer 103, at block 605. Once the reviewer 103 has provided the requisite information and/or input and the reviewer 103 confirms that the desired action should be taken, at blocks 606 and 607, the user-reviewer interface system 170 may take appropriate action, at block 608. The user-reviewer interface system 170 may then send a notification to the user 101 regarding the reviewer's action (e.g., via an SMS message, e-mail message, mobile application, or user dashboard provided through document interaction platform 171), at block 609.

The user 101, upon receipt of the notification, may request to view additional event details (e.g., by selecting a hyperlink within the notification), and in response, may be directed to the document interaction platform 171, at block 610. If additional action or input by the user 101 is required, the document interaction platform 171 may funnel the user 101 through a series of prompts soliciting the required information, at block 611. Once the user 101 has provided the requisite information and/or input and confirmed that the desired action should be taken, at blocks 612 and 613, the user-reviewer interface system 170 may take appropriate action, at block 614.

Example Method for Creating an Online Document

Figure 7:
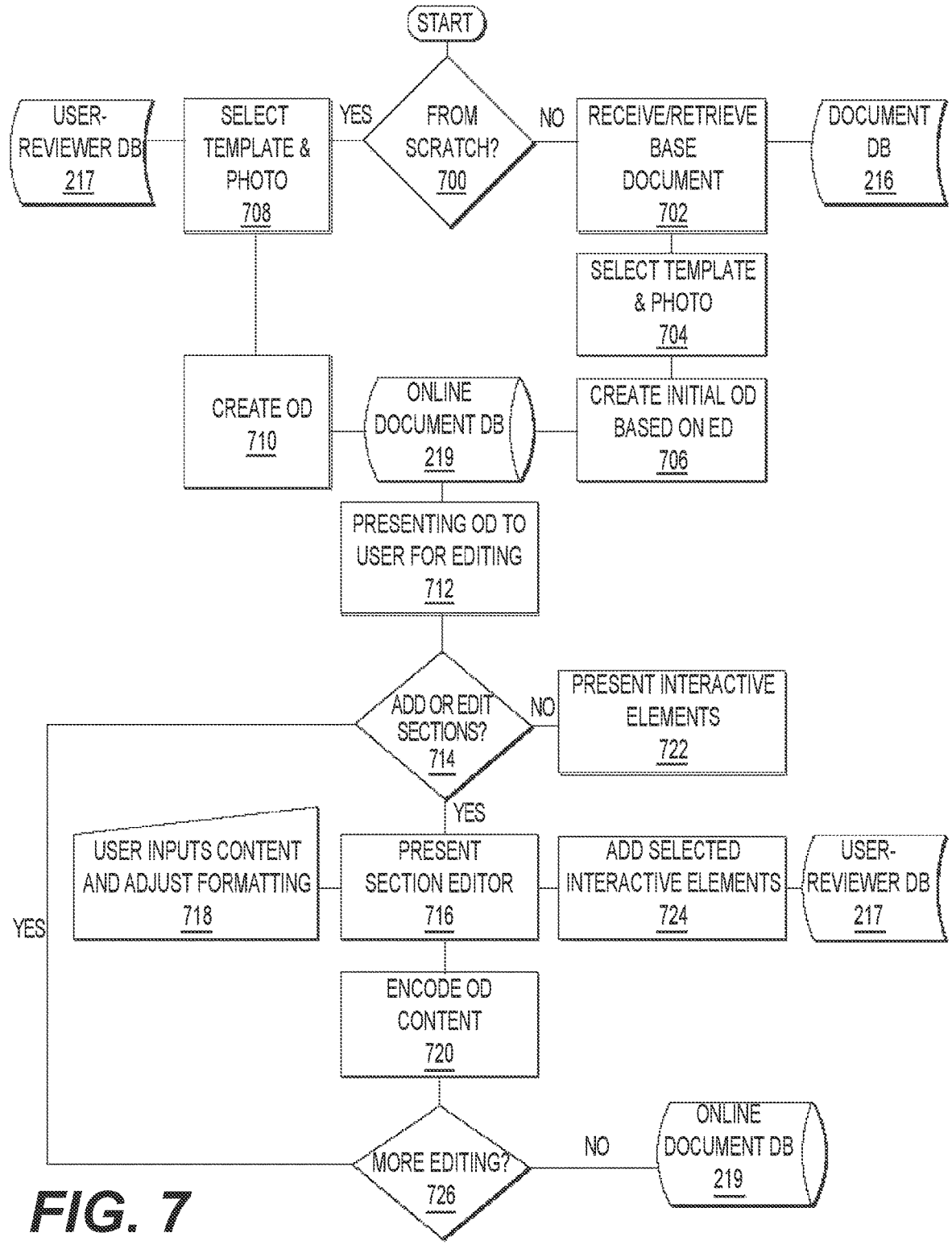
FIG. 7 depicts a flowchart of a method for creating an online document, according to one or more embodiments shown and described herein.

FIG. 7 depicts a flowchart of a method for creating an online document 155, according to one or more embodiments. The process may be executed by one or more computing devices of the online document creation system 165 (e.g., as depicted and described with reference to FIG. 14). In embodiments, the online document creation system 165 is configured to communicate and interact with the enhanced document creation system 110, the document submission system 160, the document parsing system 130, the document review system 140, the user-reviewer interface system 170, and/or the one or more users 101 and/or the reviewers 103 over the Internet 105.

The online document creation system 165 may begin the process of creating the online document 155 by determining whether the user 101 desires to create the online document from scratch or utilize a base document they may already generated at block 700. This determination may be made by directly prompting the user 101 for a choice or by determining that the user is logged-in and has previously created or uploaded one or more base documents to their profile. In the latter situation, the online document creation system may query the user as to whether they would like to create an online document based on a base document such as an existing document associated with their profile. As used herein, the "base document" refers to an unstructured document or a structured document, for example an enhanced document comprising structured data. If the determination at block 700 is "YES", indicating that the user decided to create a new online document from scratch, then the online document creation system directs the user to select a template, a photograph, and/or a background at block 708. The template generally defines a plurality of sections, each of which are configured to be encoded with content from the based document and optionally edited by the user through the online document creation system at block 710. The template further defines an initial layout structure, a color-scheme, font and font size, and the like for the initial online document. Once the sections of the template are populated by the user, at block 710, the online document creation system creates an initial online document in accordance with the selected template, and stores the same as a structured document in online document database 219.

If the determination at block 700 is "NO", indicating that the user decided to create their online document with a base document, the online document creation system prompts the user to upload their base document or provide access to the base document stored in a data storage device such as a cloud based database (e.g., the document database 216) at block 702.

At block 704, the online document creation system prompts the user 101 to select a template from a plurality of templates. The template may define a plurality of sections for content including, for example, an online website of the user, a quotation section, work availability, a timeline combining work, study, and other activities in one central timeline, work preferences (e.g., remote work, in-office, within a predefined distance or time from residence), video content, access to or display of a user's portfolio, testimonials, skills, and/or the like.

In some embodiments, the online document creation system may suggest one or more templates to a user based on one or more attributes obtained from the user's base document or user profile. The one or more attributes may include the field of work or study the user is focused in and thus offer template options consistent with those areas. Templates that are predefined for corresponding fields of work or study of the user may be suggest so that the user may efficiently and quickly select a relevant template. In addition to selecting a template, the user may be prompted to choose a photo and/or background for use within the online document 155.

At block 706, the online document creation system creates an initial online document. Creation of the initial online document includes determining whether the base document is an existing document comprising structured data. In the event the base document is not an existing document comprising structured data, that is, instead a base document comprising unstructured data, the online document creation system interacts with the enhanced document creation system 110 to parse the base document into structured data.

Once structured data is generated by the parsing process or is obtainable directly from the existing document, the online document creation system proceeds with encoding one or more sections of the template selected by the user with content extracted from the structured data to generate an initial online document. In some instances, the encoding process includes extracting and compiling content from one or more sections of structured data to complete a section of the template. That is, the one or more sections of the template may not have a direct correspondence to each of the sections of the existing document (e.g., as also referred to herein as the enhanced document). For example, encoding a first section of the one or more sections of the template includes establishing a link between an identifier for the first section of the template with a set or multiple sets of content in the base document identified with labels or the like since the content of the base document is structured. In other words, structured data categorizes and/or otherwise labels content in a meaningful way so that content, for example, in the base document can be consistently and readily identified and selected without the need to parse the content each time the document is utilized. Once the link is established between sections of the online document and the structured data of the base document, when the content of either is updated, the corresponding online document or base document may be synchronized with the updated content.

The online document creation system further identifies the presence of one or more interactive elements from the structured data. For each of the identified one or more interactive elements, the online document creation system causes a new section to be created with in the initial online document. Since the online document includes more flexibility with respect to presenting and interfacing with secondary content hosted by an external source than an enhanced document, for example, the online document creation system may not only provide the option for linking the online document to the secondary content defined by the one or more interactive elements, but may also embed the secondary content hosted on the external source within the online document.

For example, the online document creation system may generate a new section that within the initial online document that comprises a link to the secondary content hosted external. However, by way of a further example, the online document creation system may generate a new section that within the initial online document embeds an interaction platform configured to enable communication between a reviewer and an owner of the online document with the online document and/or embeds the content, such as a YouTube® video directly within the online document. It should be understood that these are only a few examples of embeddings of the one or more interactive elements within the online document. These and other interactive elements, for example, those described herein may be directly or indirectly included within a section of the online document.

Once an initial online document is encoded and one or more interactive elements from the structured data of the existing document are added to the initial online document, the online document creation system stores the initial online document is in online document database 219.

At block 712, the online document creation system may then generate for display, the initial online document to the user in an online document editing environment (e.g., implemented by the online document editor 800 depicted and described in more detail with reference to FIG. 8) configured to enable the user to selectively edit one or more sections of the initial online document. For example, the online document creation system may generate the initial online document for display on a display device of a computer display, mobile device display, an artificial reality or virtual reality display, or the like. As discussed in more detail with reference to the online document editor 800 depicted and described in more detail with reference to FIG. 8, the user, for example, is provided the ability to select to add or edit one or more sections of the online document, at block 714. For example, the online document creation system may enable the user to provide a link to other websites such as LinkedIn or YouTube to automatically create a "Video" or "About me" section in the online document.

If the user elects to add or edit an interactive elements 152 section, at block 722, the user may be presented with a set of available interactive elements 152 to choose from. Based on the user's selection, the online document creation system may add one or more interactive elements 152 to the online document 155 at block 724. The one or more interactive elements may be added by retrieving corresponding element definitions from the element definition database 215 and prompting the user for any underlying information necessary to support the functionality of the interactive elements 152 in the process, which may then be stored in user-reviewer data database 217 (e.g., block 336, FIG. 3). Alternatively, if the user 101 chooses a different section (without any interactive elements 152), at block 716, the online document creation system may present the user 101 with a form corresponding to the section for the user 101 to edit. At block 718, the user 101 may edit the contents and formatting of the section through the form presented to the user 101. This may include moving one or more sections of the initial online document from an original position defined by the template to a new position desired by the user 101.

Once complete, at block 720, the online document creation system may encode the section and update the online document 155 in online document database 219 accordingly. This process may continue until a determination is made that the user 101 is finished editing the online document 155. At block 726, after receiving an indication from the user 101 to publish, the online document creation system 165 publishes the initial online document as the online document, making the online document accessible to others, for example, on the Internet 105.

Example User Interface and Operation of the Online Document Editor

Figure 8:
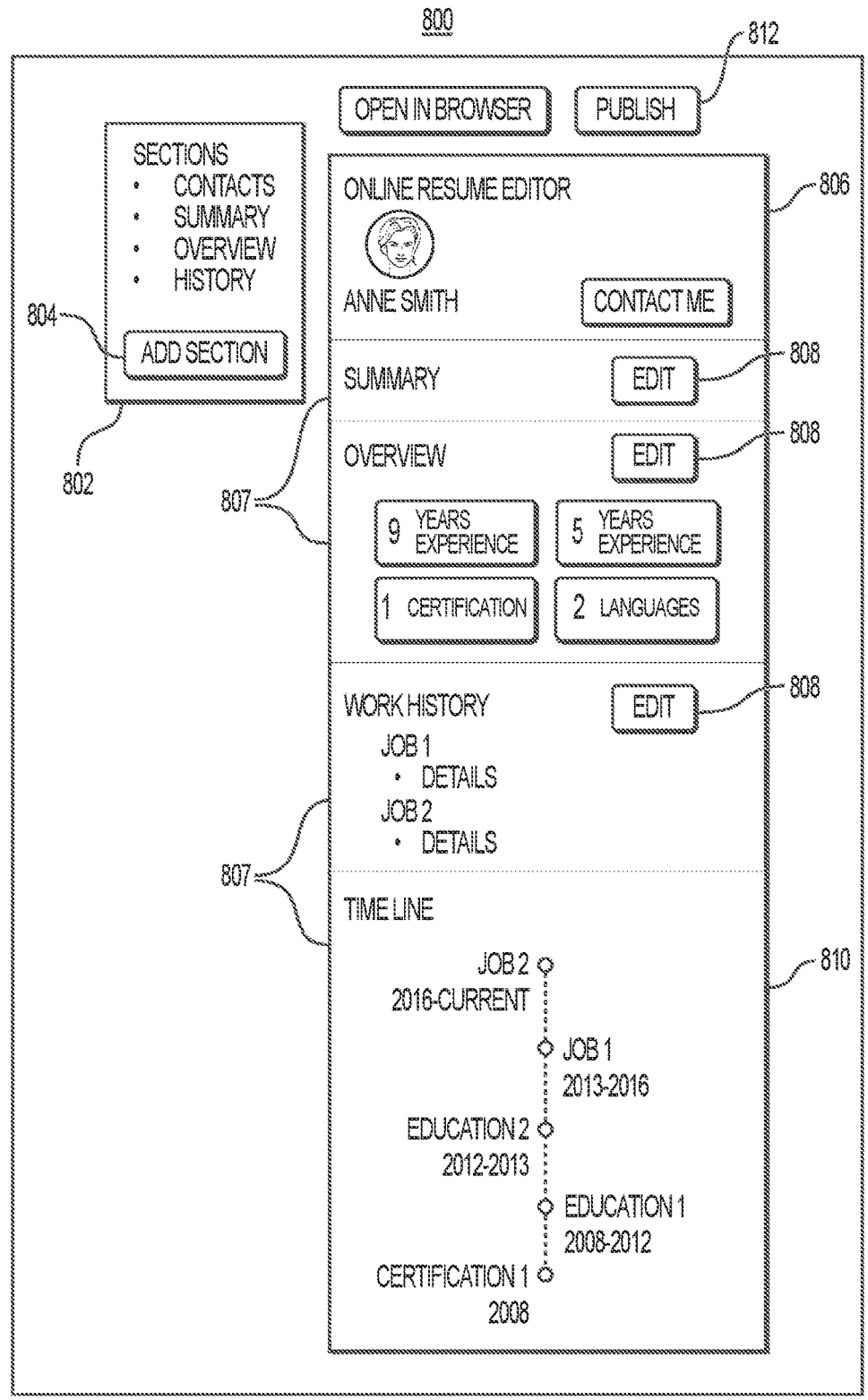
FIG. 8 depicts a sample screen for an online document editor used to edit an online document, according to one or more embodiments shown and described herein.

FIG. 8 depicts an example of an online document editor 800 that may be provided to user 101 by online document creation system 165, according to one or more embodiments. In the depicted example, a left sidebar 802 presents the user 101 with a listing of all sections 807 currently contained within the online document 155. A user 101 can select each section 807 to scroll to that section of the online document 155 or to delete the selected section 807.

For example, new sections 807 can be added by selecting "Add section" button 804, which will provide the user 101 with a selection of sections 807 that can be added and will present the user with a wizard or interactive set of steps used to create the new section 807 (e.g., populating fields, selecting a hyperlink for a video, providing informational content, etc.). The content of online document 155 is provided in a different portion of the editor 806. The user 101 can select any of the edit buttons 808 next to the section headers to edit a particular section. Once the edit button 808 is selected, the user 101 can modify the content of the section 807. The type of editor provided to the user editing different sections 807 may vary based upon the type of section 807 being edited. For example, if a user elects to edit the "Overview" section, the user may be provided with a drag and drop interface in which different summary elements may be dragged into the online document 155 to be added to that section. Alternatively, an editor for a "Work History" section may provide the user with a text editor to edit the description associated with each past position.

In some embodiments, certain sections of online document 155 may be based on information from other sections within online document 155. For example, the user 101 may elect to add a timeline section 810, which may then be populated using any relevant date contained within online document 155. For example, a central timeline is provided and each previous work position and education experience may be added as a timeline entry. Further, the timeline section 810 may include other relevant dates such as awards, dates of publications, life events, etc. The user 101 may choose to add or delete specific events from timeline section 810. Further, different sections could aggregate other data like hyperlinks or highlights.

After the user 101 has finished editing all relevant sections of the online document 155, the user may select the "publish" button 812 to make the online document viewable by reviewers 103. In some embodiments, the online document 155 may be temporarily made unavailable to reviewers 103 if it is currently being edited by user 101.

Document Management Portal

Figure 9:
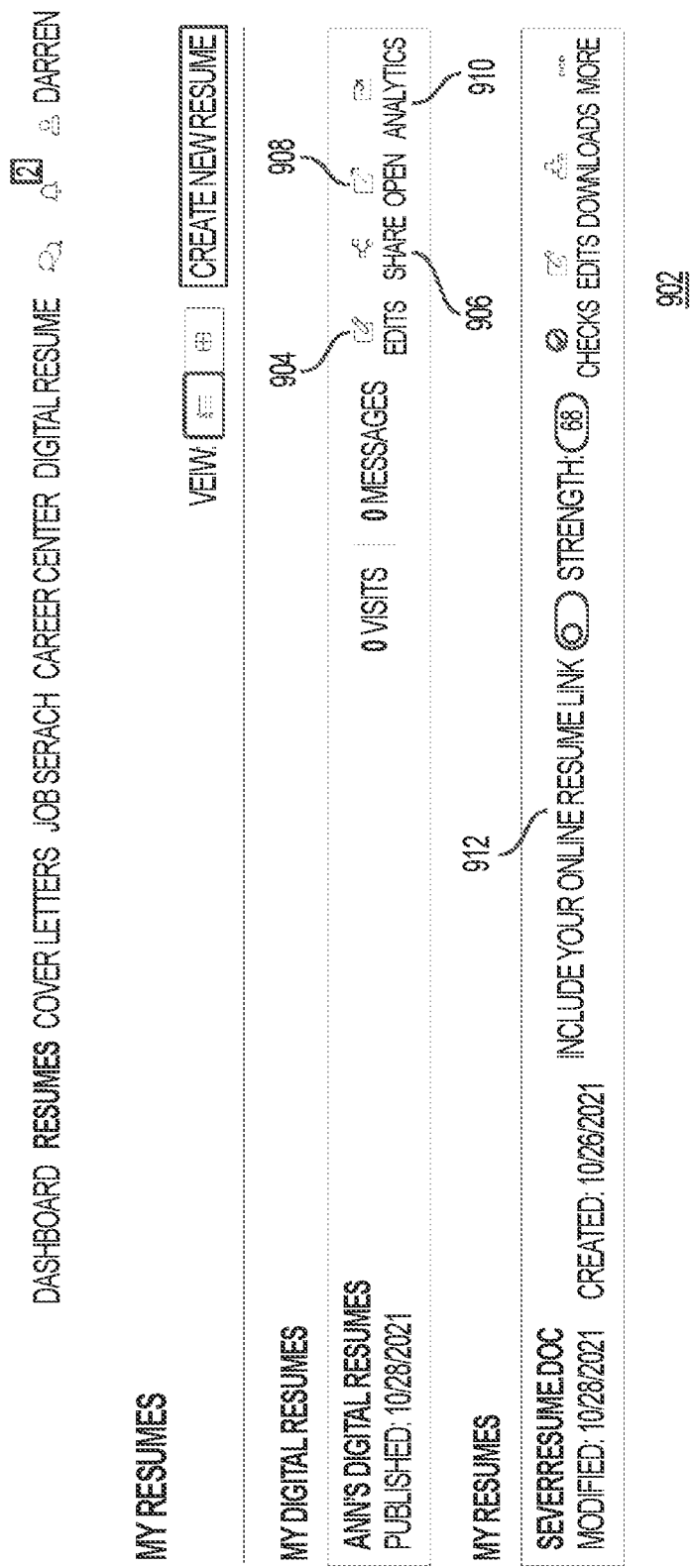
FIG. 9 depicts document portal for managing enhanced document and online documents, according to one or more embodiments shown and described herein.

In an embodiment, the user 101 is provided a document management portal 902 for managing their enhanced documents 151 and online documents 155, as shown in FIG. 9. A full list of online documents 155 is provided in a first section of document management portal 902 and a full list of enhanced documents is provided in a second section of document management portal 902. From here, the user 101 can select various options related to the online document 155, namely to edit 904, share 906, open/view 908, and analytics 910 next to the name of online document 155. If the user 101 chooses to edit the online document 155, they are redirected back to the online document editor depicted in FIG. 8.

Each enhanced document 151 is provided with an option 912 to link the selected enhanced document 151 to a particular online document 155. When the link option 912 is turned on, the user must select a particular online document 155 for linking. This causes a unique link to be inserted into the enhanced document 151 which redirects the reviewer 103 to the online document 155 as previously discussed. The link may take the form of an interactive element 152. Further, choosing option 912 may also link any shared content between the linked online document 155 and enhanced document 151, such that any edited information in shared sections is synchronized between the two documents in real time. Further, if the enhanced document 151 has been subscribed to by one or more reviewers 103, they may be notified when online document 155 has been edited and that a new version of the enhanced document 151 is available for download.

By ensuring that the link inserted into the enhanced document 151 is unique, the user can track each time that a particular online document 155 is selected using the inserted link. However, in some embodiments, the same link for a particular online document 155 may be inserted into multiple different enhanced documents 151. Then, whenever the same link is clicked by a different employer (having different source domain names), the user 101 can view analytics related to which companies or domains have visited the link by tracking incoming traffic to the same link.

A new tracking link may be created and inserted into the enhanced document 151 each time it is downloaded by user 101 or reviewer 103. The user 101 can also assign their own tracking links (e.g., for a special version of a resume).

Two or more links can be provided or embedded on the same resume and/or be scannable as a machine-readable code. A first link can be a visible link for the reviewer 103 to access an online document 155. The second (or additional) links can be designated for machines at time of parse on instruction may be provided such as adding/json to the link.

Different online document 155 may be provided based on the accessed link. For example, some sections of online document 155 may be modified or omitted if accessed from particular links. To keep track of links, a user may add keywords or name their link so the user 101 can associate it with a particular company or content of the online document 155 (e.g., "Sales Resume").

Sample Analytics Report

Figure 10:
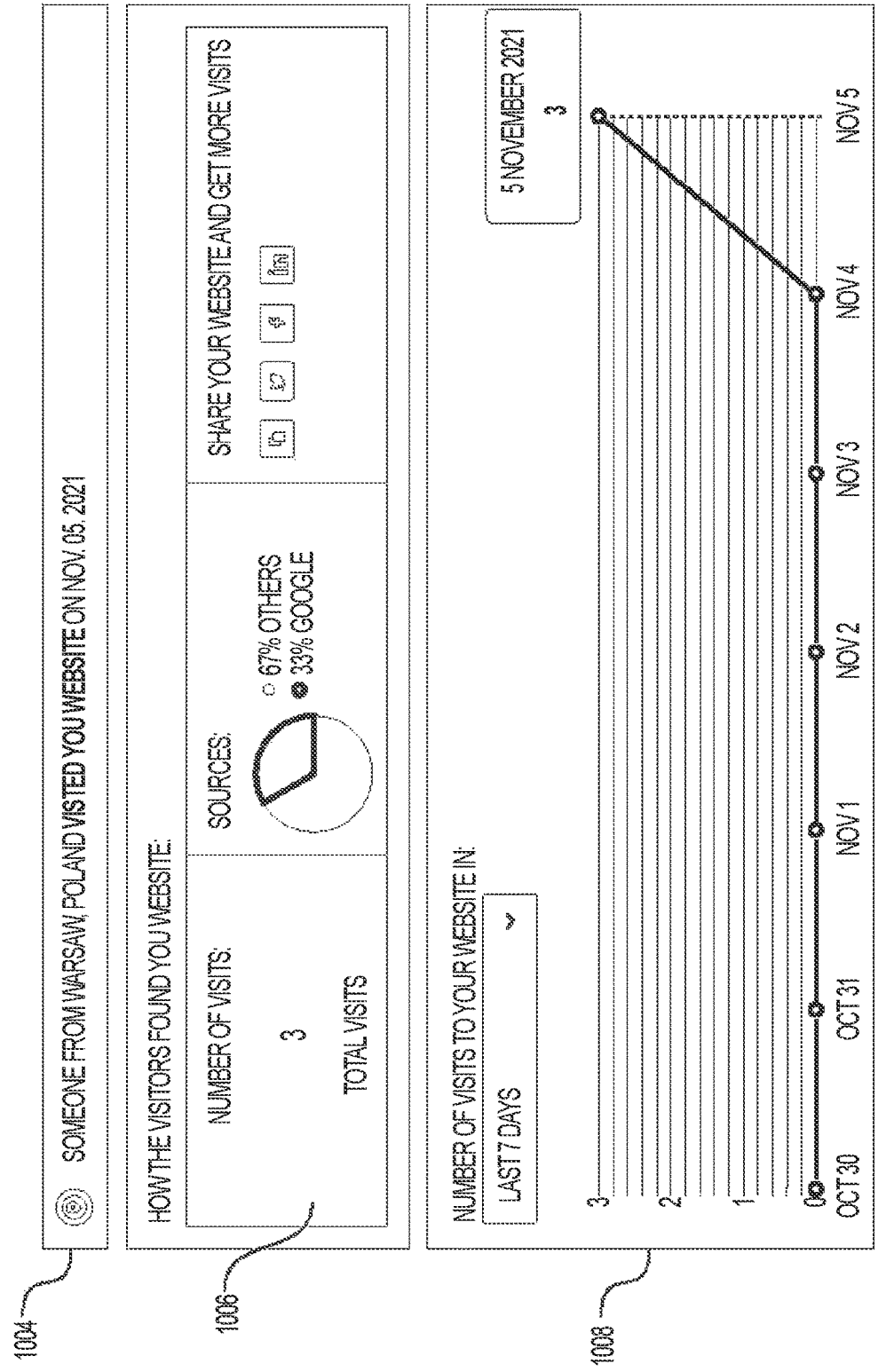
FIG. 10 depicts a sample analytics report related to a selected online document, according to one or more embodiments shown and described herein.

FIG. 10 depicts a sample analytics report, according to one or more embodiments, shown to a user if the analytics option is selected. FIG. 10 may represent a part of a user dashboard providing a variety of information pertaining to the use of the enhanced document 151, online document 155, and/or interactive elements 152. Information such as geographical area of visitors may be depicted in a first area 1004. Overall statistics 1006 may be provided in a second area which include total number of visits, source of visitors by percentage, etc. For example, by monitoring the source of visitors to online document 155, the user 101 can track which reviewers 103 are engaging with the online document 155 the most or least. A visitation timeline 1008 may be provided in a third section of the screen to depict the number of viewers per day, month, year, etc. or any selected date range. Other analytics may also be tracked such as how many times a specific interactive element 152 within online document 155 has been accessed (e.g., a Contact Me interactive element, a Video interactive element, etc.) to give the user 101 statistics on which sections of the online document 155 have the most engagement.

Example Analytics Screen for Display

FIG. 11 depicts an analytics screen 1100, according to one or more embodiments. FIG. 11 may represent a part of a user dashboard providing a variety of information pertaining to the use of the enhanced document 151, online document 155, and/or interactive elements 152. A first section 1102 show analytics related to total views and a breakdown of companies viewing the various resumes. The companies may be tracked using originating address (e.g. reviewer accessed the address from Google.com) or according to the designation assigned to enhanced document 151. For example, if a first enhanced document 151 was only sent to Facebook®, then it all views of that enhanced document 151 can be attributed to a particular company. A second section 1104 can be used to depict other analytics such as views per day/month/week. The user can alter the scale of the timeline. For example, if a user 101 makes a change to the resume and the engagement goes up, the user may want to implement that change in all enhanced documents 151 since it increased engagement.

The viewership of enhanced document 151 can further be broken down by country or city, such as in location listing 1106. This can be accomplished by using the IP address or tracking the routing of the link that accessed that accessed the resume.

Information about each of the user's active documents may be shown in summary 1108, which may include, for example, user-specified labels, document links or URLs, information about links or URLs present within the document, and a number of clicks or views of the document.

The analytics screen 1100 can also be used to manage enhanced documents 151 or online documents 155. Each version is assigned a unique resume ID (e.g., a number, name, letter, etc.). The user may add a name to the enhanced document 151 or keywords/labels related to the content within enhanced document 151. Further, the user can modify the information in the different sections of enhanced document 151 or online document 155 for each resume ID. If the user 101 is applying to a part time job, the hours could be less than a resume directed towards an application for a full time job.

Example Method for Creating an Online Document

Figure 13:
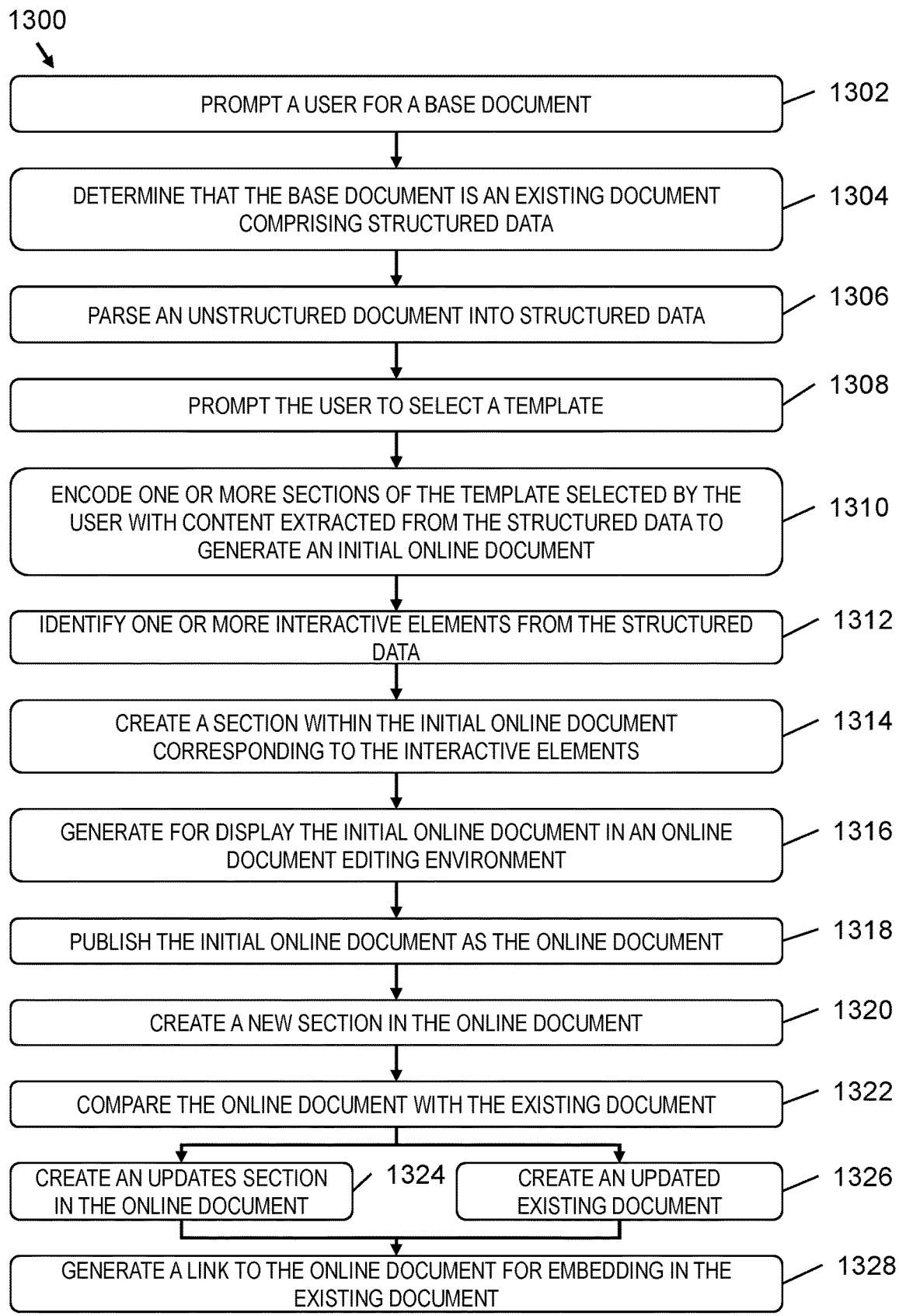
FIG. 13 depicts an illustrative flowchart of a method for creating an online document, according to one or more embodiments shown and described herein.

FIG. 13 depicts an example method for creating an online document using a base document.

In this example, method 1300 begins at step 1302 with prompting a user for a base document. For example, step 1302 may be performed by the online document creation system 165, which may provide one or more prompts through a user interface such as a graphical user interface to interactively and intuitively engage with the user.

Method 1300 proceeds to step 1304 with determining that the base document is an existing document comprising structured data. For example, step 1302 may be performed by the online document creation system 165. In some embodiments, it may be determined that the base document does not contain structured data or contains a mix of structured data and unstructured data. Accordingly, at step 1306, the method 1300 proceeds with parsing the unstructured data in the base document into structured data. For example, step 1302 may be performed by the enhanced document creation system 110 as described above with reference to FIG. 1.

Method 1300 proceeds to step 1308 with prompting the user to select a template from a plurality of templates. The template generally defines a plurality of sections, each of which are configured to be encoded with content from the based document and optionally edited by the user.

Method 1300 then proceeds to step 1310 with encoding one or more sections of the template selected by the user with content extracted from the structured data to generate an initial online document. For example, encoding a first section of the one or more sections of the template includes establishing a link between an identifier for the first section of the template with a set or multiple sets of content in the base document identified with labels or the like since the content of the base document is structured. In other words, structured data categorizes and/or otherwise labels content in a meaningful way so that content, for example, in the base document can be consistently and readily identified and selected without the need to parse the content each time the document is utilized. Once the link is established between sections of the online document and the structured data of the base document, when the content of either is updated, the corresponding online document or base document may be synchronized with the updated content.

Method 1300 then proceeds to step 1312 with identifying one or more interactive elements from the structured data and then to step 1314 with creating a section within the initial online document corresponding to the one or more interactive elements. For example, a label or field defined by the structured data may provide an indication that certain content of the existing document pertains to one or more interactive elements. Therefore, identifying the one more interactive elements may include a query of labels, fields, or other structured identifiers defined by the structured data to determine the presence of one or more interactive elements. The online document creation system, in response to the identification of one or more interactive elements, may create a new section for each of the identified one or more interactive elements. As discussed herein, the new sections in the online document may provide a hyperlink to access the content of the one or more interactive elements, embedded the content of the one or more interactive elements into the online document, and/or implement a platform such as an interaction platform within the online document that is configured to enable communication between a reviewer and an owner of the online document.

Method 1300 then proceeds to step 1316 with generating for display the initial online document in an online document editing environment, the online document editing environment configured to enable the user to selectively edit one or more sections of the initial online document. For example, step 1316 may be performed by the online document creation system providing the generated intimal online document for display on a display device of a personal computer, tablet, smartphone, or the like of the user.

Method 1300 then proceeds to step 1318 with publishing the initial online document as the online document, with the online document creation system, in response to an indication from the user to publish. The indication from the user may be generated through a selection of the a "Publish" button displayed in the online document editor such as online document editor depicted and described with reference to FIG. 8.

In some embodiments, method 1300 then proceeds to step 1320 with creating a new section in the online document to include with the one or more sections of the template based on the content of the structured data from the existing document.

Method 1300 then proceeds to step 1322 with comparing the online document with the existing document to determine a presence of a difference in content between the online document and the existing document. In some instances, a new or updated existing document may be compared to the online document to determine if there are difference and/or updates should be or could be made to either the online document or the existing document. At step 1324, when the presence of the difference in the content is determined form the comparison at step 1322, the method may the proceed with creating an updates section in the online document comprising a listing of updates present in the online document compared to the existing document. At step 1326, when the presence of the difference in the content is determined form the comparison at step 1322, the method may the proceed with creating an updated existing document comprising content present in the online document and absent from the existing document.

Method 1300 then proceeds to step 1328, which may be executed before or after other steps of method 1300, with generating a link to the online document for embedding with the existing document. The generated link may be a unique link between the online document and the existing document.

Note that FIG. 13 is just one example of a method, and other methods including fewer, additional, or alternative steps are possible consistent with this disclosure.

Example Online Document Creation System

Figure 14:
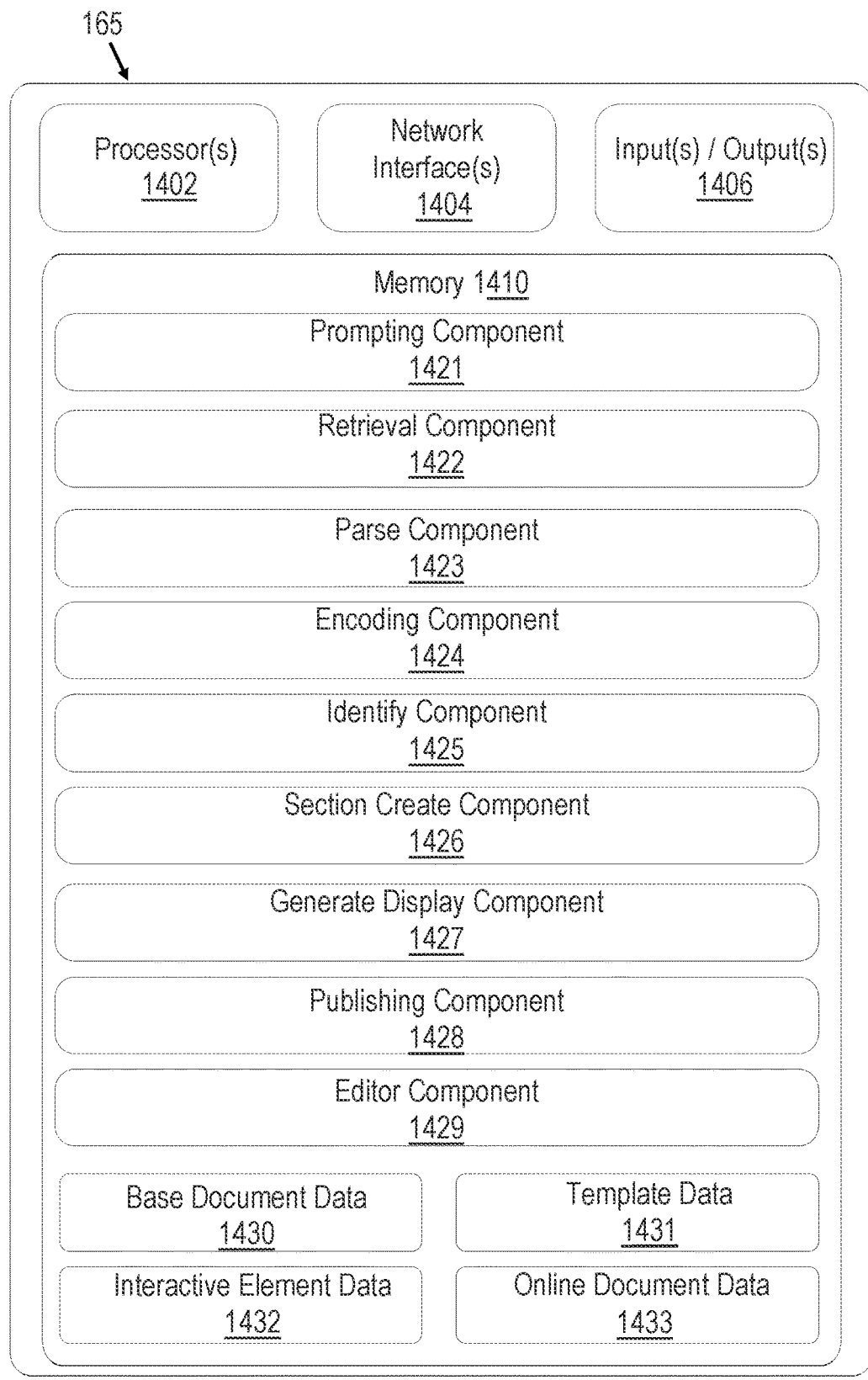
FIG. 14 schematically depicts example online document creation system, according to one or more embodiments shown and described herein

FIG. 14 depicts an example online document creation system 165 configured to perform methods described herein.

The online document creation system 165 includes one or more processors 1402. Generally, processor(s) 1402 may be configured to execute computer-executable instructions (e.g., software code) to perform various functions, as described herein.

The online document creation system 165 further includes a network interface(s) 1404, which generally provides data access to any sort of data network, including personal area networks (PANs), local area networks (LANs), wide area networks (WANs), the Internet, and the like.

The online document creation system 165 further includes input(s) and output(s) 1406, which generally provide means for providing data to and from the online document creation system 165, such as via connection to computing device peripherals, including user interface peripherals.

The online document creation system 165 further includes a memory 1410 configured to store various types of components and data.

In this example, memory 1410 includes a prompting component 1421, a retrieval component 1422, a parse component 1423, an encoding component 1424, an identify component 1425, a section create component 1426, a generate display component 1427, a publishing component 1428, and/or an editor component 1429.

Prompting component 1421 is configured to perform processes, for example, corresponding to block 700 of the method depicted and described with reference to FIG. 7 and/or processes corresponding to steps 1302 and 1308 of the method 1300 depicted and described with reference to FIG. 13 and/or other functions. In some embodiments, the prompting component 1421 may access the base document data 1430 and stores a received copy of the base document form a user. In embodiments, the prompting component 1421 may access the template data 1431 to extract a plurality of templates to provide to the user for selection.

Retrieval component 1422 is configured to perform processes, for example, corresponding to block 702 of the method depicted and described with reference to FIG. 7 and/or other functions. For example, the retrieval component 1422 may cause the online document creation system to interface with, for example, the document database 216 depicted and described with reference to FIG. 2 to perform one or more of the aforementioned processes. However, in some embodiments, the retrieval component 1422 may cause the online document creation system to access the base document data 1430 to retrieve a base document.

Parse component 1423 is configured to perform processes, for example, corresponding to step 1306 of the of the method 1300 depicted and described with reference to FIG. 13 and/or other functions. For example, the parse component 1423 may cause the online document creation system to interface with, for example, the document parsing system 130 depicted and described with reference to FIG. 1 to perform one or more of the aforementioned processes.

Encoding component 1424 is configured to perform processes corresponding to blocks 704, 706, 708, 710 of the method depicted and described with reference to FIG. 7 and/or processes corresponding to step 1310 of the method 1300 depicted and described with reference to FIG. 13 and/or other functions.

Identify component 1425 is configured to perform processes corresponding to step 1312 of the method 1300 depicted and described with reference to FIG. 13 and/or other functions.

Section create component 1426 is configured to perform processes corresponding to step 1314 of the method 1300 depicted and described with reference to FIG. 13 and/or other functions.

Generate display component 1427 is configured to perform processes corresponding to step 1316 of the method 1300 depicted and described with reference to FIG. 13 and/or other functions. In some embodiment, the generate display component 1427 may cause the online document creation system to interface with, for example, a display device of a user, such that content the generate display component 1427 generates may be transmitted to the display device of the user using the network interface(s) 1404 and other network components.

Publishing component 1428 defines logic for performing processes corresponding to block 726 of the method depicted and described with reference to FIG. 7 and/or processes corresponding to step 1318 of the method 1300 depicted and described with reference to FIG. 13 and/or other functions. In some embodiment, the publishing component 1428 may cause generated online document to be transmitted to and/or caused to be stored on an online document database 219, for example, as depicted and described with reference to at least FIG. 2.

Editor component 1429 defines logic for performing processes corresponding to blocks 712, 714, 716, 718, 720, 722, and 724 of the method depicted and described with reference to FIG. 7 and/or processes corresponding to steps 1320, 1322, 1324, 1326, and/or 1328 of the method 1300 depicted and described with reference to FIG. 13 and/or other functions. For example, the editor component 1429 may implement the online document editor 800 depicted and described with reference to FIG. 8. In the implemented editing environment, the user may be provided with interactive user interfaces to make edits to the generated online document.

In this example, memory 1410 also includes base document data 1430, template data 1431, interactive element data 1432, and online document data 1433.

Base document data 1430 refers to the unstructured document or a structured document, for example an enhanced document 151 comprising structured data depicted and described with reference to FIG. 1. Template data 1431 refers to plurality of templates described with reference to FIG. 7. Interactive element data 1432 refers to interactive elements 152 depicted and described with reference to FIG. 1. Online document data 1433 refers to the online document 155 depicted and described with reference to at least FIGS. 1, 7, and 8. It should be understood that the base document data 1430, template data 1431, interactive element data 1432, and online document data 1433 may be stored in data storage devices external from the online document creation system in some embodiments.

The online document creation system 165 may be implemented in various ways. For example, the online document creation system 165 may be implemented within on-site, remote, or cloud-based computing devices.

The online document creation system 165 is just one example, and other configurations are possible. For example, in alternative embodiments, aspects described with respect to the online document creation system 165 may be omitted, added, or substituted for alternative aspects.

Example Clauses

Implementation examples are described in the following numbered clauses:

Clause 1: A computer-implemented method for creating an online document, the method comprising prompting, with an online document creation system, a user for a base document; determining, with the online document creation system, that the base document is an existing document comprising structured data; prompting, with the online document creation system, the user to select a template from a plurality of templates; encoding, with the online document creation system, one or more sections of the template selected by the user with content extracted from the structured data to generate an initial online document; identifying, with the online document creation system, one or more interactive elements from the structured data; creating, with the online document creation system, a section within the initial online document corresponding to at least one of the one or more interactive elements; generating for display, with the online document creation system, the initial online document in an online document editing environment, the online document editing environment configured to enable the user to selectively edit one or more sections of the initial online document; and publishing, with the online document creation system, the initial online document as the online document, with the online document creation system, in response to an indication from the user to publish.

Clause 2: The method of Clause 1, wherein one of the one or more sections of the template comprise a central timeline, the central timeline is encoded with events extracted from a plurality of fields defined by the structured data.

Clause 3: The method of any one of Clauses 1-2, further comprising creating a new section in the online document to include with the one or more sections of the template based on the content of the structured data from the existing document.

Clause 4: The method of any one of Clauses 1-3, further comprising: comparing the online document with the existing document to determine a presence of a difference in content between the online document and the existing document; and in response to determining the presence of the difference in the content, creating an updates section in the online document comprising a listing of updates present in the online document compared to the existing document.

Clause 5: The method of any one of Clauses 1-4, further comprising: comparing the online document with the existing document to determine a presence of a difference in content between the online document and the existing document; and in response to determining the presence of the difference in the content, creating an updated existing document comprising content present in the online document and absent from the existing document.

Clause 6: The method of any one of Clauses 1-5, further comprising generating a link to the online document for embedding with the existing document.

Clause 7: The method of any one of Clauses 1-6, wherein the one or more interactive elements comprise a link to secondary content hosted external to the online document.

Clause 8: The method of any one of Clauses 1-7, wherein the one or more interactive elements comprise a link to an interaction platform configured to enable communication between a reviewer and an owner of the online document.

Clause 9: The method of any one of Clauses 1-8, wherein the section within the online document corresponding to the one or more interactive elements comprises an embedding of secondary content hosted externally from the online document and linked to by the one or more interactive elements.

Clause 10: The method of any one of Clauses 1-9, further comprising: determining that the base document is an unstructured document; and parsing the unstructured document into the structured data.

Clause 11: A system for creating an online document, the system comprising a computing device comprising one or more processors and one or more non-transitory computer-readable mediums storing computer readable instructions that, when executed by the one or more processors, cause the computing device to: prompt a user for a base document; determine that the base document is an existing document comprising structured data; prompt the user to select a template from a plurality of templates; encode one or more sections of the template selected by the user with content extracted from the structured data to generate an initial online document; identify one or more interactive elements from the structured data; create a section within the initial online document corresponding to at least one of the one or more interactive elements; generate for display the initial online document in an online document editing environment, the online document editing environment configured to enable the user to selectively edit one or more sections of the initial online document; and publish the initial online document as the online document, in response to an indication from the user to publish.

Clause 12: The system of Clause 11, wherein one of the one or more sections of the template comprises a central timeline, the central timeline is encoded with events extracted from a plurality of fields defined by the structured data.

Clause 13: The system of any one of Clauses 11-12, wherein the computer readable instructions that, when executed by the one or more processors, further cause the computing device to create a new section in the online document to include with the one or more sections of the template based on the content of the structured data from the existing document.

Clause 14: The system of any one of Clauses 11-13, wherein the computer readable instructions that, when executed by the one or more processors, further cause the computing device to: compare the online document with the existing document to determine a presence of a difference in content between the online document and the existing document; and in response to determining the presence of the difference in the content, creating an updates section in the online document comprising a listing of updates present in the online document compared to the existing document.

Clause 15: The system of any one of Clauses 11-14, wherein the computer readable instructions that, when executed by the one or more processors, further cause the computing device to: compare the online document with the existing document to determine a presence of a difference in content between the online document and the existing document; and in response to determining the presence of the difference in the content create an updated existing document comprising content present in the online document and absent from the existing document.

Clause 16: The system of any one of Clauses 11-15, wherein the computer readable instructions that, when executed by the one or more processors, further cause the computing device to generate a link to the online document for embedding with the existing document.

Clause 17: The system of any one of Clauses 11-16, wherein the one or more interactive elements comprise a link to secondary content hosted external to the online document.

Clause 18: The system of any one of Clauses 11-17, wherein the one or more interactive elements comprise a link to an interaction platform configured to enable communication between a reviewer and an owner of the online document.

Clause 19: The system of any one of Clauses 11-18, wherein the section within the online document corresponding to the one or more interactive elements comprises an embedding of secondary content hosted externally from the online document and linked to by the one or more interactive elements.

Clause 20: The system of any one of Clauses 11-19, wherein the computer readable instructions that, when executed by the one or more processors, further cause the computing device to: determine that the base document is an unstructured document; and parse the unstructured document into the structured data.

Clause 21: A processing system, comprising: a memory comprising computer-executable instructions; and a processor configured to execute the computer-executable instructions and cause the processing system to perform a method in accordance with any one of Clauses 1-10.

Clause 22: A processing system, comprising means for performing a method in accordance with any one of Clauses 1-10.

Clause 23: A non-transitory computer-readable medium comprising computer-executable instructions that, when executed by a processor of a processing system, cause the processing system to perform a method in accordance with any one of Clauses 1-10.

Clause 24: A computer program product embodied on a computer-readable storage medium comprising code for performing a method in accordance with any one of Clauses 1-10.

Additional Considerations

The description provided above is intended to be illustrative and non-limiting. Thus, it will be apparent to one skilled in the art that modifications may be made to the present disclosure as described without departing from the scope of the claims set out below. Moreover, while the above description was provided with reference to the creation of enhanced documents and online documents, the disclosure is not thus limited, and may be naturally extended to other contexts.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents.

What is claimed is:

1. A computer-implemented method for creating an online document, the method comprising:
    prompting, with an online document creation system, a user for a base document;
    determining, with the online document creation system, that the base document is an existing document comprising structured data;
    prompting, with the online document creation system, the user to select a template from a plurality of templates;
    encoding, with the online document creation system, one or more sections of the template selected by the user with content extracted from the structured data to generate an initial online document;
    identifying, with the online document creation system, one or more interactive elements from the structured data;
    creating, with the online document creation system, a section within the initial online document corresponding to at least one of the one or more interactive elements;
    generating for display, with the online document creation system, the initial online document in an online document editing environment, the online document editing environment configured to enable the user to selectively edit one or more sections of the initial online document; and
    publishing, with the online document creation system, the initial online document as the online document, with the online document creation system, in response to an indication from the user to publish.

2. The method of claim 1, wherein one of the one or more sections of the template comprise a central timeline, the central timeline is encoded with events extracted from a plurality of fields defined by the structured data.

3. The method of claim 1, further comprising creating a new section in the online document to include with the one or more sections of the template based on the content of the structured data from the existing document.

4. The method of claim 1, further comprising:
comparing the online document with the existing document to determine a presence of a difference in content between the online document and the existing document; and
in response to determining the presence of the difference in the content, creating an updates section in the online document comprising a listing of updates present in the online document compared to the existing document.

5. The method of claim 1, further comprising:
comparing the online document with the existing document to determine a presence of a difference in content between the online document and the existing document; and
in response to determining the presence of the difference in the content, creating an updated existing document comprising content present in the online document and absent from the existing document.

6. The method of claim 1, further comprising generating a link to the online document for embedding with the existing document.

7. The method of claim 1, wherein the one or more interactive elements comprise a link to secondary content hosted external to the online document.

8. The method of claim 1, wherein the one or more interactive elements comprise a link to an interaction platform configured to enable communication between a reviewer and an owner of the online document.

9. The method of claim 1, wherein the section within the online document corresponding to the one or more interactive elements comprises an embedding of secondary content hosted externally from the online document and linked to by the one or more interactive elements.

10. The method of claim 1, further comprising:
determining that the base document is an unstructured document; and
parsing the unstructured document into the structured data.

11. A system for creating an online document, the system comprising:
a computing device comprising one or more processors and one or more non-transitory computer-readable mediums storing computer readable instructions that, when executed by the one or more processors, cause the computing device to:
prompt a user for a base document;
determine that the base document is an existing document comprising structured data;
prompt the user to select a template from a plurality of templates;
encode one or more sections of the template selected by the user with content extracted from the structured data to generate an initial online document;
identify one or more interactive elements from the structured data;
create a section within the initial online document corresponding to at least one of the one or more interactive elements;
generate for display the initial online document in an online document editing environment, the online document editing environment configured to enable the user to selectively edit one or more sections of the initial online document; and
publish the initial online document as the online document, in response to an indication from the user to publish.

12. The system of claim 11, wherein one of the one or more sections of the template comprises a central timeline, the central timeline is encoded with events extracted from a plurality of fields defined by the structured data.

13. The system of claim 11, wherein the computer readable instructions that, when executed by the one or more processors, further cause the computing device to create a new section in the online document to include with the one or more sections of the template based on the content of the structured data from the existing document.

14. The system of claim 11, wherein the computer readable instructions that, when executed by the one or more processors, further cause the computing device to:
compare the online document with the existing document to determine a presence of a difference in content between the online document and the existing document; and
in response to determining the presence of the difference in the content, creating an updates section in the online document comprising a listing of updates present in the online document compared to the existing document.

15. The system of claim 11, wherein the computer readable instructions that, when executed by the one or more processors, further cause the computing device to:
compare the online document with the existing document to determine a presence of a difference in content between the online document and the existing document; and
in response to determining the presence of the difference in the content create an updated existing document comprising content present in the online document and absent from the existing document.

16. The system of claim 11, wherein the computer readable instructions that, when executed by the one or more processors, further cause the computing device to generate a link to the online document for embedding with the existing document.

17. The system of claim 11, wherein the one or more interactive elements comprise a link to secondary content hosted external to the online document.

18. The system of claim 11, wherein the one or more interactive elements comprise a link to an interaction platform configured to enable communication between a reviewer and an owner of the online document.

19. The system of claim 11, wherein the section within the online document corresponding to the one or more interactive elements comprises an embedding of secondary content hosted externally from the online document and linked to by the one or more interactive elements.

20. The system of claim 11, wherein the computer readable instructions that, when executed by the one or more processors, further cause the computing device to:
determine that the base document is an unstructured document; and
parse the unstructured document into the structured data.

* * * * *